(12) United States Patent
Kim et al.

(10) Patent No.: US 12,266,819 B2
(45) Date of Patent: *Apr. 1, 2025

(54) ENERGY STORAGE MODULE INCLUDING EXTINGUISHER SHEET

(71) Applicant: Samsung SDI Co., Ltd., Yongin-si (KR)

(72) Inventors: Jin Taek Kim, Yongin-si (KR); Eun Ok Kwak, Yongin-si (KR); Jin Bhum Yun, Yongin-si (KR); Jang Hoon Kim, Yongin-si (KR); Jong Yeol Woo, Yongin-si (KR); Kwang Deuk Lee, Yongin-si (KR); Woo Sung Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/014,853

(22) Filed: Sep. 8, 2020

(65) Prior Publication Data

US 2021/0074976 A1 Mar. 11, 2021

(30) Foreign Application Priority Data

Sep. 5, 2019 (KR) .......................... 10-2019-0110364

(51) Int. Cl.
*H01M 10/658* (2014.01)
*H01M 10/613* (2014.01)
(Continued)

(52) U.S. Cl.
CPC ....... *H01M 50/383* (2021.01); *H01M 10/613* (2015.04); *H01M 10/647* (2015.04);
(Continued)

(58) Field of Classification Search
CPC .................................................. H01M 50/383
See application file for complete search history.

(56) References Cited

U.S. PATENT DOCUMENTS 5,047,272 A * 9/1991 Hassel .................... B32B 27/20
428/40.4
5,817,434 A 10/1998 Brooker et al.
(Continued)

FOREIGN PATENT DOCUMENTS

| CN | 101847709 A | 9/2010 |
| CN | 102468463 A | 5/2012 |

(Continued)

OTHER PUBLICATIONS

EPO Extended European Search Report dated Feb. 8, 2021, issued in corresponding European Patent Application No. 20194607.6 (10 pages).

(Continued)

*Primary Examiner* — Amanda J Barrow
(74) *Attorney, Agent, or Firm* — Womble Bond Dickinson (US) LLP

(57) ABSTRACT

An energy storage module includes: a cover member including an internal receiving space configured to accommodate battery cells each including a vent; a top plate coupled to a top of the cover member and including ducts respectively corresponding to the vents of the battery cells; a top cover coupled to a top portion of the top plate and including discharge holes located in an exhaust area and respectively corresponding to the ducts; and an extinguisher sheet located between the top cover and the top plate, and configured to emit a fire extinguishing agent at a temperature exceeding a reference temperature, and the top cover includes protrusion parts located on a bottom surface of the top cover, covering the exhaust area, and coupled to an exterior of the ducts.

18 Claims, 23 Drawing Sheets

(51) Int. Cl.
  *H01M 10/647* (2014.01)
  *H01M 50/147* (2021.01)
  *H01M 50/24* (2021.01)
  *H01M 50/30* (2021.01)
  *H01M 50/383* (2021.01)
  *H01M 50/40* (2021.01)

(52) U.S. Cl.
  CPC ....... *H01M 10/658* (2015.04); *H01M 50/147* (2021.01); *H01M 50/24* (2021.01); *H01M 50/394* (2021.01); *H01M 50/40* (2021.01)

(56) References Cited

U.S. PATENT DOCUMENTS

| | | | |
|---|---|---|---|
| 6,136,423 A * | 10/2000 | Fitzpatrick | B29C 73/163 428/304.4 |
| 6,365,299 B1 | 4/2002 | Miyaki et al. | |
| 7,385,480 B2 * | 6/2008 | Fitzpatrick | A62C 99/0045 169/58 |
| 8,557,437 B2 | 10/2013 | Hinoki et al. | |
| 8,597,808 B2 | 12/2013 | Park et al. | |
| 8,652,666 B2 | 2/2014 | Kim | |
| 8,722,253 B2 | 5/2014 | Hinoki et al. | |
| 9,406,917 B2 | 8/2016 | Petzinger | |
| 9,627,663 B2 | 4/2017 | Kim | |
| 10,164,229 B2 | 12/2018 | Ohshiba et al. | |
| 10,355,326 B2 | 7/2019 | Petzinger | |
| 10,930,910 B2 * | 2/2021 | Fujiwara | H01M 50/3425 |
| 11,038,226 B2 | 6/2021 | Lee et al. | |
| 11,145,933 B2 | 10/2021 | Kim et al. | |
| 11,185,726 B2 | 11/2021 | Lee | |
| 2002/0179552 A1 | 12/2002 | Marraffa | |
| 2003/0134203 A1 | 7/2003 | Fan et al. | |
| 2007/0164711 A1 * | 7/2007 | Kim | H01M 10/6595 320/149 |
| 2010/0028758 A1 | 2/2010 | Eaves et al. | |
| 2010/0167115 A1 | 7/2010 | Okada et al. | |
| 2010/0248026 A1 | 9/2010 | Hinoki et al. | |
| 2011/0005781 A1 * | 1/2011 | Yasui | B60L 58/27 169/54 |
| 2011/0165454 A1 | 7/2011 | Iwamoto et al. | |
| 2011/0274951 A1 * | 11/2011 | Yasui | H01M 50/512 429/99 |
| 2011/0313084 A1 * | 12/2011 | Furar | C08G 18/73 524/101 |
| 2012/0114993 A1 | 5/2012 | Park et al. | |
| 2012/0270083 A1 | 10/2012 | Kim | |
| 2013/0011701 A1 | 1/2013 | Petzinger | |
| 2013/0052452 A1 * | 2/2013 | Lee | C09D 5/185 428/323 |
| 2013/0264077 A1 * | 10/2013 | Jung | H01M 50/383 169/54 |
| 2013/0313466 A1 * | 11/2013 | Bliznets | A62D 1/0092 252/8 |
| 2013/0344384 A1 | 12/2013 | Hinoki et al. | |
| 2014/0170447 A1 * | 6/2014 | Woehrle | A62D 1/0007 429/61 |
| 2014/0322566 A1 * | 10/2014 | Kim | H01M 50/20 429/56 |
| 2015/0064514 A1 | 3/2015 | Wu et al. | |
| 2015/0079426 A1 * | 3/2015 | Chen | H01M 50/308 429/53 |
| 2015/0099191 A1 | 4/2015 | Liu et al. | |
| 2015/0221914 A1 | 8/2015 | Page et al. | |
| 2015/0280193 A1 | 10/2015 | Ohshiba et al. | |
| 2015/0303421 A1 | 10/2015 | Tazawa et al. | |
| 2015/0318526 A1 | 11/2015 | Mune et al. | |
| 2016/0049626 A1 * | 2/2016 | Yasui | H01M 50/20 429/54 |
| 2016/0104880 A1 | 4/2016 | Gao et al. | |
| 2016/0218333 A1 | 7/2016 | Takasaki et al. | |
| 2016/0254515 A1 | 9/2016 | Shimoda et al. | |
| 2016/0268564 A1 | 9/2016 | Cho et al. | |
| 2016/0315361 A1 | 10/2016 | Petzinger | |
| 2017/0077545 A1 | 3/2017 | Shafer, II et al. | |
| 2017/0165513 A1 * | 6/2017 | Li | B60L 3/0046 |
| 2017/0334310 A1 | 11/2017 | Yokoyama et al. | |
| 2018/0026245 A1 * | 1/2018 | Page | H01M 10/4207 429/82 |
| 2018/0190956 A1 | 7/2018 | Lica et al. | |
| 2018/0248160 A1 * | 8/2018 | Lee | A62D 1/0028 |
| 2018/0269440 A1 | 9/2018 | Lee et al. | |
| 2018/0294516 A1 | 10/2018 | Huang et al. | |
| 2018/0309107 A1 | 10/2018 | Widener | |
| 2019/0020079 A1 | 1/2019 | Lee et al. | |
| 2019/0109331 A1 | 4/2019 | Skala | |
| 2019/0168037 A1 * | 6/2019 | Lian | H01M 50/60 |
| 2019/0168615 A1 | 6/2019 | Besson et al. | |
| 2019/0173074 A1 * | 6/2019 | Ogawa | H01M 50/10 |
| 2019/0181419 A1 | 6/2019 | Suba et al. | |
| 2019/0305391 A1 | 10/2019 | Petzinger | |
| 2019/0334143 A1 * | 10/2019 | Sugeno | H01M 50/20 |
| 2020/0014027 A1 | 1/2020 | Ha et al. | |
| 2020/0014078 A1 | 1/2020 | Ha et al. | |
| 2020/0168884 A1 | 5/2020 | Wang et al. | |
| 2020/0243823 A1 * | 7/2020 | Morita | H01M 50/553 |
| 2020/0287180 A1 | 9/2020 | Chen et al. | |
| 2020/0290933 A1 | 9/2020 | Honda | |
| 2020/0303701 A1 * | 9/2020 | Kim | H01M 50/3425 |
| 2020/0350557 A1 | 11/2020 | Ha et al. | |
| 2020/0350566 A1 | 11/2020 | Ha et al. | |
| 2020/0350567 A1 | 11/2020 | Ha et al. | |
| 2020/0350568 A1 | 11/2020 | Lee et al. | |
| 2020/0350574 A1 | 11/2020 | Ha et al. | |
| 2020/0350580 A1 | 11/2020 | Ha et al. | |
| 2020/0350632 A1 | 11/2020 | Ha et al. | |
| 2020/0377690 A1 | 12/2020 | Ootsuki et al. | |
| 2021/0013460 A1 | 1/2021 | Ootsuki et al. | |
| 2021/0163303 A1 | 6/2021 | Evans et al. | |
| 2021/0296625 A1 * | 9/2021 | Li | H01M 50/124 |
| 2021/0320337 A1 * | 10/2021 | Chen | H01M 50/204 |
| 2021/0328281 A1 * | 10/2021 | Chu | H01M 10/52 |
| 2021/0328304 A1 * | 10/2021 | You | A62C 3/16 |
| 2022/0059902 A1 * | 2/2022 | Jiang | H01M 10/658 |
| 2022/0069411 A1 * | 3/2022 | Wakabayashi | H01M 50/227 |
| 2022/0140434 A1 * | 5/2022 | Yoshida | H01M 50/3425 429/82 |
| 2022/0149477 A1 * | 5/2022 | Yoshida | H01M 10/653 |
| 2022/0149478 A1 * | 5/2022 | Egashira | H01M 50/3425 |
| 2022/0263188 A1 | 8/2022 | Wakabayashi et al. | |

FOREIGN PATENT DOCUMENTS

| | | | | |
|---|---|---|---|---|
| CN | 106654462 A | | 5/2017 | |
| CN | 106785225 A | | 5/2017 | |
| CN | 206564279 U | | 10/2017 | |
| CN | 206584999 U | | 10/2017 | |
| CN | 206834290 U | | 1/2018 | |
| CN | 107887550 A | | 4/2018 | |
| CN | 207199806 U | | 4/2018 | |
| CN | 207474524 U | | 6/2018 | |
| CN | 207977389 | * | 10/2018 | ............ H01M 2/20 |
| CN | 207977389 U | | 10/2018 | |
| CN | 109273803 A | | 1/2019 | |
| CN | 109585726 | * | 4/2019 | ............ H01M 2/10 |
| CN | 109585726 A | | 4/2019 | |
| EP | 3 386 003 A1 | | 10/2018 | |
| EP | 3 591 737 A1 | | 1/2020 | |
| EP | 3 866 233 A1 | | 8/2021 | |
| JP | 2014-135234 A | | 7/2014 | |
| JP | 6245038 B2 | | 11/2015 | |
| JP | 2016-110881 A | | 6/2016 | |
| JP | 6390062 B2 | | 6/2016 | |
| JP | 2019-213332 A | | 12/2019 | |
| KR | 10-1067627 B1 | | 9/2011 | |
| KR | 2012-0049020 A | | 5/2012 | |
| KR | 2012-0119407 A | | 10/2012 | |
| KR | 2014-0127743 A | | 11/2014 | |
| KR | 10-2016-0021325 A | | 2/2016 | |
| KR | 10-2016-0146349 A | | 12/2016 | |
| KR | 10-2019-0023917 | * | 3/2019 | ......... H01M 10/613 |
| WO | WO 2013/006796 A1 | | 1/2013 | |

(56) References Cited

FOREIGN PATENT DOCUMENTS

| WO | WO 2019/117485 A1 | 6/2019 | |
| WO | WO 2019/117485 * | 6/2020 | ............ H01M 2/12 |
| WO | WO 2020/203646 A1 | 10/2020 | |

OTHER PUBLICATIONS

Machine English Translation of CN207199806U, 3 pages.
PubChem Compound Summary for Vermiculite, retrieved on Apr. 5, 2022 from the Internet: https://pubchem.ncbi.nlm.nih.gov/compound/156593754 (Year: 2022).
U.S. Advisory Action from U.S. Appl. No. 16/844,914, dated Jan. 20, 2022, 4 pages.
U.S. Notice of Allowance from U.S. Appl. No. 16/901,547, dated Jul. 23, 2021, 8 pages.
U.S. Office Action from U.S. Appl. No. 16/901,474, dated Apr. 25, 2022, 37 pages.
U.S. Office Action from U.S. Appl. No. 16/901,527, dated Apr. 11, 2022, 24 pages.
European Patent Office Extended Search Report, for Patent Application No. 20194587.0, mailed Feb. 16, 2021, 10 pages.
European Patent Office Extended Search Report, for Patent Application No. 20194592.0, mailed Feb. 8, 2021, 9 pages.
European Patent Office Extended Search Report, for Patent Application No. 20194611.8, mailed Feb. 16, 2021, 9 pages.
European Patent Office Extended Search Report, for Patent Application No. 20194589.6, mailed Mar. 5, 2021, 9 pages.
European Patent Office Extended Search Report, for Patent Application No. 20194594.6, mailed Feb. 10, 2021, 9 pages.
European Patent Office Extended Search Report, for Patent Application No. 20194573.0, mailed Feb. 12, 2021, 9 pages.
"The Engineering Tool Box", https://www.engineeringtoolbox.com/density-materials-d1652.html, Aug. 30, 2021 (Year: 2021), 16 pages.
U.S. Notice of Allowance from U.S. Appl. No. 16/901,538, dated Mar. 18, 2022, 8 pages.
U.S. Office Action from U.S. Appl. No. 16/844,914, dated Aug. 19, 2021, 18 pages.
U.S. Office Action from U.S. Appl. No. 16/844,914, dated Mar. 17, 2022, 24 pages.
U.S. Office Action from U.S. Appl. No. 16/844,914, dated Nov. 9, 2021, 18 pages.
U.S. Office Action from U.S. Appl. No. 16/901,474, dated Oct. 20, 2021, 21 pages.
U.S. Office Action from U.S. Appl. No. 16/901,522, dated Dec. 13, 2021, 40 pages.
U.S. Office Action from U.S. Appl. No. 16/901,538, dated Nov. 23, 2021, 20 pages.
U.S. Office Action from U.S. Appl. No. 16/901,541, dated Dec. 8, 2021, 32 pages.
U.S. Office Action from U.S. Appl. No. 16/901,541, dated Mar. 22, 2022, 17 pages.
U.S. Office Action from U.S. Appl. No. 17/014,034, dated Dec. 13, 2021, 40 pages.
U.S. Office Action from U.S. Appl. No. 17/014,061, dated Feb. 15, 2022, 20 pages.
U.S. Office Action from U.S. Appl. No. 17/014,900, dated Dec. 10, 2021, 21 pages.
U.S. Office Action from U.S. Appl. No. 17/014,900, dated Mar. 28, 2022, 8 pages.
U.S. Office Action from U.S. Appl. No. 17/014,970, dated Mar. 2, 2022, 38 pages.
U.S. Office Action from U.S. Appl. No. 17/014,976, dated Dec. 22, 2021, 24 pages.
U.S. Restriction Requirement from U.S. Appl. No. 16/844,914, dated May 12, 2021, 6 pages.
U.S. Restriction Requirement from U.S. Appl. No. 17/014,970, dated Oct. 22, 2021, 6 pages.
Advisory Action for U.S. Appl. No. 16/901,474 dated Jul. 7, 2022, 4 pages.
Collins Online Dictionary entry for "space", accessed at https://www.collinsdictionary.com/us/dictionary/english/space on May 18, 2022 (Year: 2022).
Final Office Action for U.S. Appl. No. 16/901,522 dated May 27, 2022, 24 pages.
Final Office Action for U.S. Appl. No. 17/014,034 dated May 25, 2022, 38 pages.
Final Office Action for U.S. Appl. No. 17/014,970 dated Jun. 24, 2022, 38 pages.
Final Office Action for U.S. Appl. No. 17/014,976 dated Jun. 7, 2022, 24 pages.
Google define feature utilizing Oxford Languages Dictionary for "space", accessed at google.com on May 18, 2022 (Year: 2022).
U.S. Notice of Allowance from U.S. Appl. No. 16/901,541, dated Jun. 1, 2022, 8 pages.
Advisory Action for U.S. Appl. No. 17/014,061 dated Oct. 21, 2022, 7 pages.
Notice of Allowance for U.S. Appl. No. 17/014,976 dated Oct. 19, 2022, 8 pages.
Advisory Action for U.S. Appl. No. 17/014,970 dated Sep. 9, 2022, 3 pages.
Final Office Action for U.S. Appl. No. 16/844,914 dated Jul. 20, 2022, 8 pages.
Final Office Action for U.S. Appl. No. 17/014,061 dated Jul. 18, 2022, 16 pages.
Notice of Allowance for U.S. Appl. No. 16/844,914 dated Sep. 28, 2022, 7 pages.
Notice of Allowance for U.S. Appl. No. 16/901,538 dated Sep. 16, 2022, 9 pages.
Notice of Allowance for U.S. Appl. No. 17/014,900 dated Aug. 30, 2022, 8 pages.
Notice of Allowance for U.S. Appl. No. 16/901,541 dated Jul. 27, 2022, 8 pages.
Notice of Allowance for U.S. Appl. No. 17/014,976 dated Aug. 16, 2022, 9 pages.
Office Action for U.S. Appl. No. 16/901,474 dated Aug. 17, 2022, 22 pages.
Final Office Action for U.S. Appl. No. 16/901,527 dated Oct. 4, 2022, 22 pages.
Office Action for U.S. Appl. No. 16/901,522 dated Oct. 4, 2022, 15 pages.
Office Action for U.S. Appl. No. 17/014,034 dated Oct. 4, 2022, 15 pages.
Office Action for U.S. Appl. No. 17/014,970 dated Oct. 5, 2022, 38 pages.
Notice of Allowance for U.S. Appl. No. 16/844,914 dated Dec. 8, 2022, 8 pages.
Notice of Allowance for U.S. Appl. No. 16/901,474 dated Dec. 13, 2022, 10 pages.
Notice of Allowance for U.S. Appl. No. 16/901,538 dated Nov. 23, 2022, 9 pages.
Notice of Allowance for U.S. Appl. No. 16/901,541 dated Dec. 14, 2022, 8 pages.
Notice of Allowance for U.S. Appl. No. 17/014,034 dated Jan. 27, 2023, 7 pages.
Notice of Allowance for U.S. Appl. No. 17/014,900 dated Feb. 13, 2023, 8 pages.
Notice of Allowance for U.S. Appl. No. 17/014,976 dated Dec. 7, 2022, 8 pages.
Office Action for U.S. Appl. No. 17/014,089 dated Dec. 9, 2022, 8 pages.
US Final Office Action dated Mar. 13, 2023, issued in U.S. Appl. No. 16/901,522 (12 pages).
US Office Action dated Mar. 15, 2023, issued in U.S. Appl. No. 17/014,061 (16 pages).
US Final Office Action dated Apr. 13, 2023, issued in U.S. Appl. No. 17/014,970 (43 pages).
US Office Action dated Aug. 30, 2023, issued in U.S. Appl. No. 17/014,970 (22 pages).
Chinese Office Action dated Dec. 20, 2023, issued in Chinese Patent Application No. 202010919375.3 (19 pages, include 11 pages of English translation).

(56) References Cited

OTHER PUBLICATIONS

Chinese Office Action for CN Application No. dated Dec. 20, 2023 issued in Chinese Patent Application No. 202010919377.2 (21 pages, including 12 pages with English translation).
Korean Office Action dated Aug. 7, 2024, issued in corresponding Korean Patent Application No. 10-2020-0113361, 5 pages.
Korean Office Action dated Aug. 7, 2024, issued in corresponding Korean Patent Application No. 10-2020-0113374, 5 pages.
Korean Office Action dated Aug. 7, 2024, issued in Korean Patent Application No. 10- 2020-0113360, 5 pages.
Korean Office Action dated Aug. 7, 2024, issued in Korean Patent Application No. 10- 2020-0113373, 5 pages.
Korean Office Action dated Aug. 7, 2024, issued in Korean Patent Application No. KR 10-2020-0113358, 5 pages.
Korean Office Action dated Aug. 7, 2024, issued in Korean Patent Application No. 10- 2020-0113371, 6 pages.
Korean Office Action dated Aug. 7, 2024, issued in Korean Patent Application No. 10- 2020-0113363, 5 pages.
Korean Office Action dated Aug. 7, 2024, issued in Korean Patent Application No. 10- 2020-0113376, 5 pages.
Korean Office Action dated Aug. 7, 2024, issued in Korean Patent Application No. 10- 2020-0113377, 6 pages.
US Office Action dated Aug. 12, 2024, issued in U.S. Appl. No. 18/531,462 (28 pages).
US Office Action dated Sep. 29, 2024, issued in U.S. Appl. No. 17/564,152 (27 pages).
US Office Action dated Sep. 30, 2024, issued in U.S. Appl. No. 17/563,964 (15 pages).
US Office Action dated Feb. 24, 2023, issued in U.S. Appl. No. 16/901,527 (26 pages).
US Notice of Allowance dated Mar. 7, 2023, issued in U.S. Appl. No. 17/014,089 (11 pages).
US Final Office Action dated Dec. 18, 2024, issued in U.S. Appl. No. 18/531,462 (30 pages).
US Office Action dated Dec. 19, 2024, issued in U.S. Appl. No. 18/641,219 (35 pages).
US Final Office Action dated Feb. 25, 2025, issued in U.S. Appl. No. 17/563,964 (13 pages).

\* cited by examiner

ENERGY STORAGE MODULE INCLUDING EXTINGUISHER SHEET

CROSS-REFERENCE TO RELATED APPLICATIONS

This application claims priority to and the benefit of each of Korean Patent Application No. 10-2019-0110364, filed on Sep. 5, 2019 in the Korean Intellectual Property Office, and Korean Patent Application No. 10-2020-0113374, filed on Sep. 4, 2020 in the Korean Intellectual Property Office, the entire content of each of which is herein incorporated by reference.

BACKGROUND

1. Field

Aspects of embodiments of the present disclosure relate to an energy storage module.

2. Description of the Related Art

An energy storage module may be linked with a renewal energy and power system, such as, for example, a solar cell, to store electric power when demand for the electric power from a load is low, and to use (or discharge or provide) the stored electric power when demand for the electric power is high. The energy storage module generally includes (or is) an apparatus including a large number of battery cells (e.g., secondary batteries or secondary battery cells).

The battery cells are generally received (or accommodated) in multiple trays, which are received in a rack, and multiple racks are received in a container box.

Recently, there have been many cases in which fires occur to energy storage modules. Once a fire occurs to the energy storage module, it is not easy to extinguish the fire due to characteristics of the energy storage module. An energy storage module, including a plurality of battery cells, generally demonstrates high-capacity high-output characteristics, and research into technology for increasing the safety of the energy storage module is being actively conducted.

SUMMARY

According to an aspect of embodiments of the present disclosure, an energy storage module having improved safety is provided. According to another aspect of embodiments of the present disclosure, an energy storage module exhibiting a reduced fire risk and increased safety by reducing or minimizing the chance of a fire spreading to adjacent battery cells when a fire occurs is provided.

According to one or more embodiments of the present disclosure, an energy storage module includes a cover member comprising an internal receiving space configured to accommodate battery cells each comprising a vent; a top plate coupled to a top of the cover member and comprising ducts respectively corresponding to the vents of the battery cells; a top cover coupled to a top portion of the top plate and including discharge holes located in an exhaust area and respectively corresponding to the ducts; and an extinguisher sheet located between the top cover and the top plate, and configured to emit a fire extinguishing agent at a temperature exceeding a certain temperature (e.g. a reference temperature), wherein the top cover includes protrusion parts located on a bottom surface of the top cover, covering the exhaust area and, and coupled to an exterior of the ducts.

In an embodiment, the extinguisher sheet may include opening holes located to respectively correspond to the ducts.

In an embodiment, the extinguisher sheet may include a receiving space receiving a fire extinguishing agent within an external case made of polyurea and polyurethane.

In an embodiment, the receiving space may include one or more capsules or tubes.

In an embodiment, the fire extinguishing agent may include a halogenated carbon compound.

In an embodiment, the extinguisher sheet may include different types of sheets configured to emit the fire extinguishing agent at different temperatures.

In an embodiment, a ratio of the weight of the fire extinguishing agent in the extinguisher sheet to a total weight of the extinguisher sheet may be from 30% to 50%.

In an embodiment, an amount of the fire extinguishing agent in the extinguisher sheet may be from $0.12$ $g/cm^3$ to $0.82$ $g/cm^3$.

In an embodiment, the top cover may further include an inclined part having a thickness gradually increasing toward the protrusion part in the exhaust area.

In an embodiment, a top end of the duct may be lower than the inclined part.

In an embodiment, a space may be defined between the duct and the protrusion part, and some of the gas discharged from the vent may pass through the duct to be discharged to the space through the inclined part.

In an embodiment, the duct may have an inner diameter gradually decreasing upward.

In an embodiment, a portion of the exhaust area may extend into an interior of the ducts.

In an embodiment, the exhaust area may have a smaller thickness than the top cover.

In an embodiment, the exhaust area may protrude downwardly from the top cover.

In an embodiment, an area of the discharge holes may be greater than or equal to about 30% of that of the exhaust area.

At least some of the above and other features of the invention are set out in the claims.

As described above, according to an aspect of embodiments of the present disclosure, the energy storage device can prevent or reduce heat from spreading to adjacent cells by rapidly extinguishing and cooling a battery cell when a vent of the battery cell opens (or ruptures) or when a fire occurs.

DESCRIPTION OF REFERENCE NUMERALS

Figure 1:
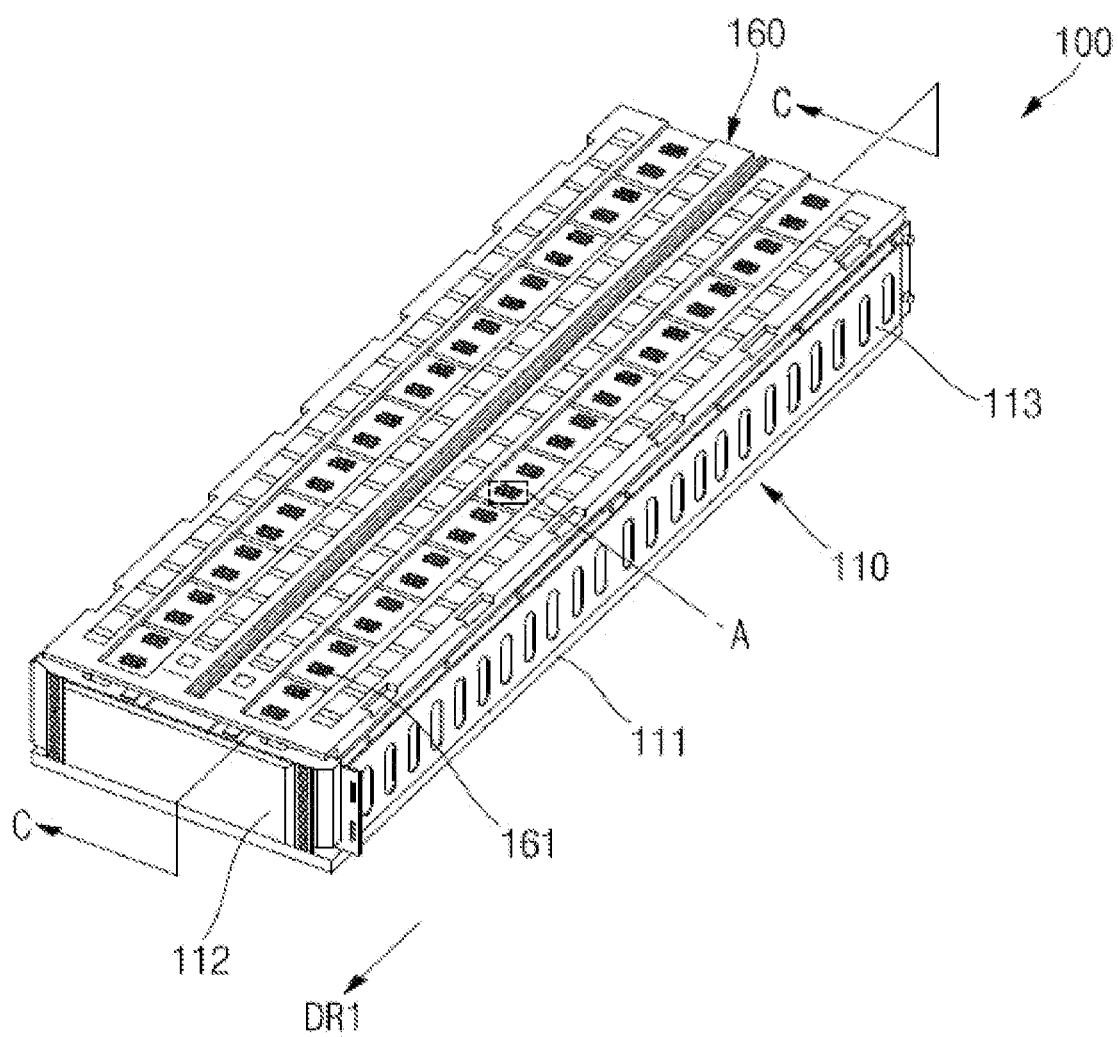
FIG. 1 is a perspective view of an energy storage module according to an embodiment of the present disclosure.

| | |
|---|---|
| 100, 200: Energy storage module | 110, 210: Cover member |
| 120: Battery cell | 130: Insulation spacer |
| 131: Sheet part 195330 | 132: Edge part |
| 140: Top plate | 141: Duct |
| 143: Opening hole | |
| 150, 150A, 150B, 150C: Extinguisher sheet | |
| 151: Opening hole | 152, 152A, 152B: Receiving space |
| 160: Top cover | |

DETAILED DESCRIPTION

Herein, some embodiments of the present disclosure will be described in further detail. The subject matter of the present disclosure, however, may be embodied in many different forms and should not be construed as being limited to the example embodiments set forth herein. Rather, these example embodiments are provided so that this disclosure will be thorough and complete and will convey aspects and features of the present disclosure to those skilled in the art.

In addition, in the accompanying drawings, sizes or thicknesses of various components may be exaggerated for brevity and clarity. Like numbers refer to like elements throughout. As used herein, the term "and/or" includes any and all combinations of one or more of the associated listed items. In addition, it is to be understood that when an element A is referred to as being "connected to" an element B, the element A may be directly connected to the element B or one or more intervening elements C may be present therebetween such that the element A and the element B are indirectly connected to each other.

The terminology used herein is for the purpose of describing particular embodiments and is not intended to be limiting of the disclosure. As used herein, the singular forms are intended to include the plural forms as well, unless the context clearly indicates otherwise. It is to be further understood that the terms "comprise" and/or "comprising," when used in this specification, specify the presence of stated features, numbers, steps, operations, elements, and/or components, but do not preclude the presence or addition of one or more other features, numbers, steps, operations, elements, components, and/or groups thereof.

It is to be understood that, although the terms "first," "second," etc. may be used herein to describe various members, elements, regions, layers, and/or sections, these members, elements, regions, layers, and/or sections should not be limited by these terms. These terms are only used to distinguish one member, element, region, layer, and/or section from another. Thus, for example, a first member, a first element, a first region, a first layer, and/or a first section discussed below could be termed a second member, a second element, a second region, a second layer, and/or a second section without departing from the teachings of the present disclosure.

Spatially relative terms, such as "beneath," "below," "lower," "above," "upper," and the like, may be used herein for ease of description to describe one element or feature's relationship to another element(s) or feature(s) as illustrated in the figures. It is to be understood that the spatially relative terms are intended to encompass different orientations of the device in use or operation in addition to the orientation depicted in the figures. For example, if the device in the figures is turned over, elements described as "below" or "beneath" other elements or features would then be oriented "on" or "above" the other elements or features. Thus, the term "below" can encompass both an orientation of above and below.

Unless otherwise defined, all terms (including technical and scientific terms) used herein have the same meaning as commonly understood by one of ordinary skill in the art to which this disclosure belongs. It is to be further understood that terms, such as those defined in commonly used dictionaries, should be interpreted as having a meaning that is consistent with their meaning in the context of the relevant art and are not to be interpreted in an idealized or overly formal sense unless expressly so defined herein.

Herein, a configuration of an energy storage module according to some example embodiments of the present disclosure will be described.

Figure 2:
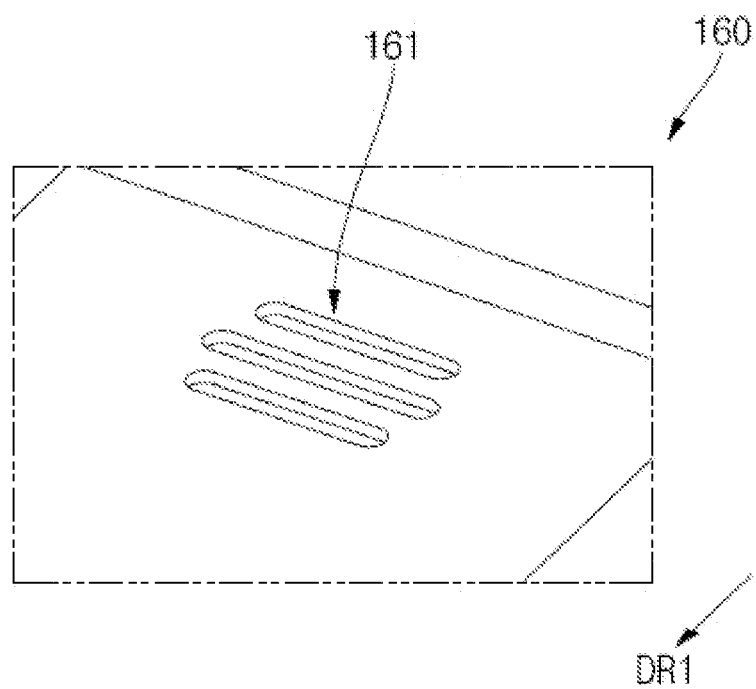
FIG. 2 is an enlarged view of a region "A" of FIG. 1.
Figure 3:
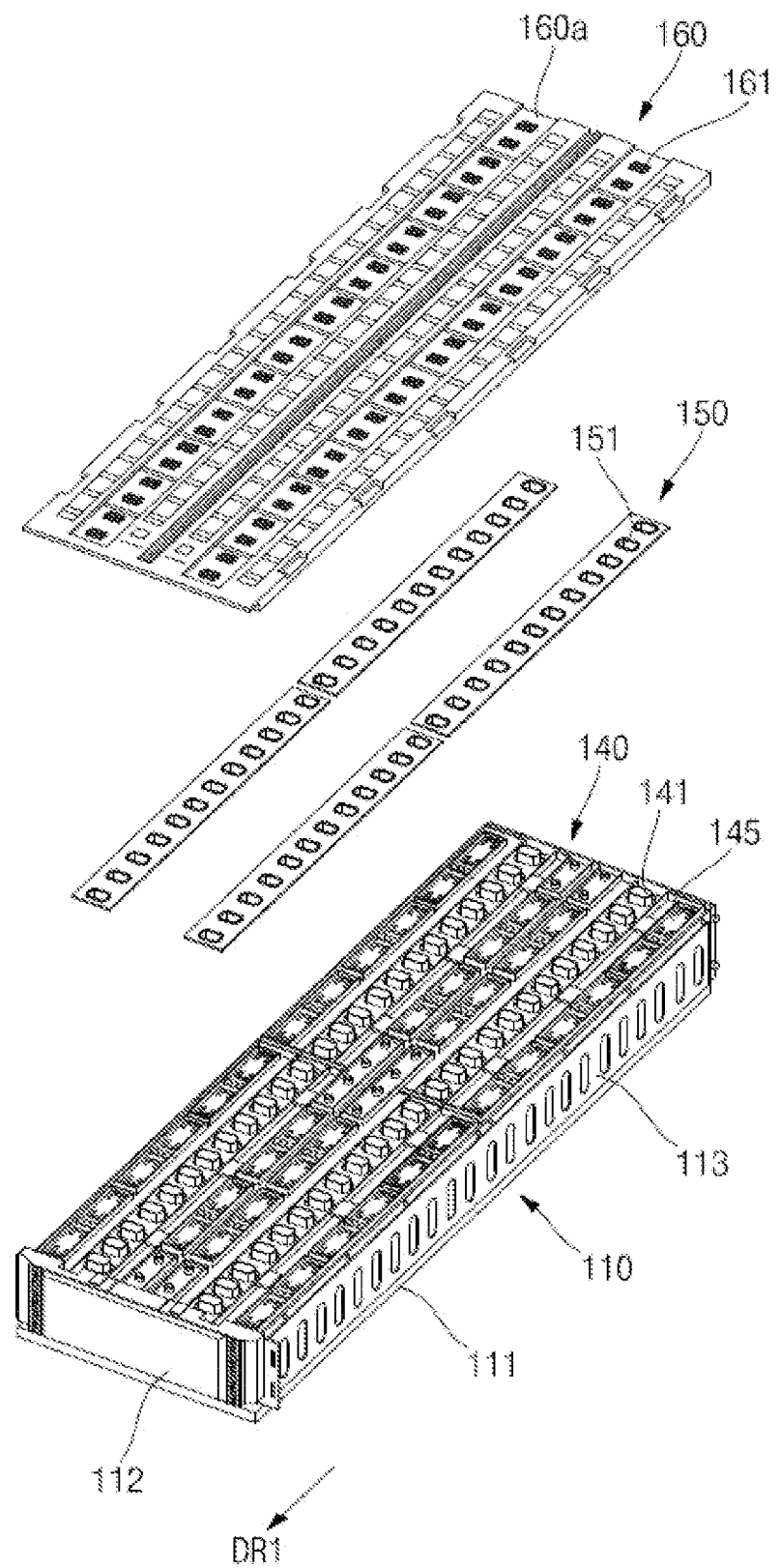
FIG. 3 is an exploded perspective view of the energy storage module shown in FIGS. 1 and 2.
Figure 4:
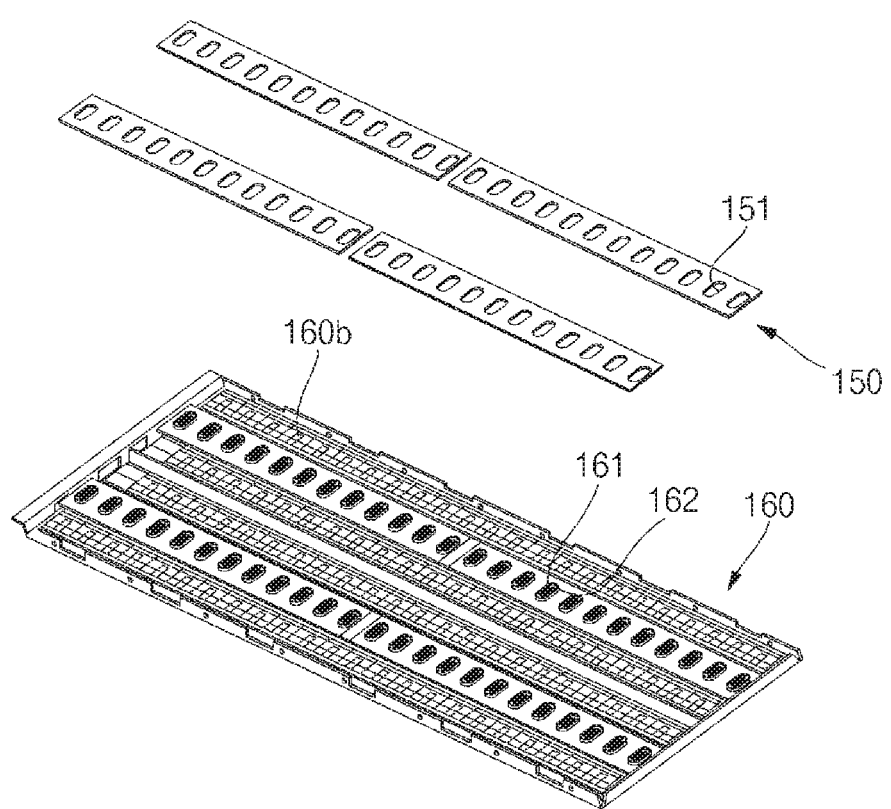
FIG. 4 is an exploded bottom perspective view of an extinguisher sheet and a top cover in the energy storage module shown in FIGS. 1 to 3.

FIG. 1 is a perspective view of an energy storage module according to an embodiment of the present disclosure; FIG. 2 is an enlarged view of a region "A" of FIG. 1; FIG. 3 is an exploded perspective view of the energy storage module shown in FIGS. 1 and 2; and FIG. 4 is an exploded bottom perspective view of an extinguisher sheet and a top cover in the energy storage module shown in FIGS. 1 to 3.

Referring to FIGS. 1 to 4, an energy storage module 100 according to an embodiment of the present disclosure includes a cover member 110, a top plate 140, an extinguisher sheet 150, and a top cover 160.

The cover member 110 provides an internal space for receiving (or accommodating) battery cells and insulation spacers. In an embodiment, the cover member 110 includes a bottom plate 111, an end plate 112, and a side plate 113 which together form a space for arranging the battery cells and the insulation spacers. In addition, the cover member 110 may fix positions of the battery cells and the insulation spacers and may protect the battery cells from external impacts.

The top plate 140 is coupled to a top portion (e.g., a top surface or a top) of the cover member 110. The top plate 140 may be coupled to the cover member 110 while covering top portions (e.g., top surfaces) of the battery cells. In an embodiment, the positive electrode terminals and negative electrode terminals of the battery cells are exposed to (or through) the top plate 140, and bus bars 145 are coupled to the respective terminals, thereby connecting the battery cells to one another in series, in parallel, or in series/parallel.

The top plate 140 includes a plurality of ducts 141 located to respectively correspond to vents, which are located on a top surface of each of the respective battery cells. Accordingly, the gas discharged from the vents of the battery cells may move upwardly along the ducts 141 of the top plate 140. The configuration and operation of the ducts 141 will be described in further detail below.

The extinguisher sheet 150 is positioned between the top plate 140 and the top cover 160. The extinguisher sheet 150 may be provided as one or more members (or sheets) extending in a direction, for example, in a length direction of the top plate 140. In addition, the extinguisher sheet 150 may include openings (e.g., opening holes) positioned to respectively correspond to the ducts 141 of the top plate 140. Accordingly, the extinguisher sheet 150 may be positioned such that the openings therein are respectively aligned with the ducts 141 of the top plate 140. In addition, the extinguisher sheet 150 may be coupled to a bottom surface 160*b* of the top cover 160. Because the extinguisher sheet 150 is coupled to the bottom surface 160*b* of the top cover 160, the extinguisher sheet 150 may be positioned above the top plate 140. The configuration and operation of the extinguisher sheet 150 will be described below in further detail.

The top cover 160 is coupled to the top portion of the top plate 140. The top cover 160 may cover the top plate 140 and the bus bar 145. The top cover 160 also covers the extinguisher sheet 150, which is coupled to the bottom surface 160*b* of the top cover 160, thereby protecting the top plate 140, the bus bar 145, and the extinguisher sheet 150 from external impacts applied to a top surface 160*a* of the top cover 160. In addition, the top cover 160 includes discharge openings (e.g., discharge holes) 161. In addition, the top cover 160 includes protrusion parts (e.g., protrusions) 162 spaced by a distance (e.g., a predetermined distance) apart from the outer periphery of (e.g., may extend around a periphery of) respective ones of the discharge holes 161, and the protrusion parts 162 downwardly protrude from the top cover 160. Openings (e.g., opening holes) 151 of the extinguisher sheet 150 may be coupled to (e.g., may extend around) the exterior of the respective ones of the protrusion parts 162, and the ducts 141 are coupled to (e.g., may extend into) the interior of the respective ones of the protrusion parts 162. The discharge holes 161 are positioned to respectively correspond to the ducts 141 of the top plate 140. Accordingly, the gases discharged from the vent of the battery cell when the vent ruptures may be discharged to the exterior through the corresponding duct 141 of the top plate 140 and the corresponding discharge hole 161 of the top cover 160. In an embodiment, the discharge hole 161 of the top cover 160 may have an appropriate size to prevent or substantially prevent a user's hand from contacting an internal structure of the top cover 160.

In an embodiment, as will be further described below, a rack includes a plurality of shelves and a plurality of the energy storage modules 100 accommodated on the shelves. For example, the rack may include a plurality of shelves mounted thereon to be spaced apart from one another, and one or more energy storage modules 100 may be accommodated on each of the plurality of shelves. In an embodiment, a bottom surface of one of the energy storage modules 100 may contact a top surface of one of the shelves, and a bottom surface of another one of the energy storage modules 100 may be positioned on a top surface of another shelf while being spaced a distance apart from the top surface thereof.

Herein, the coupling relationship between the duct 141 of the top plate 140 and the top cover 160 in the energy storage module 100 according to an embodiment of the present disclosure will be described in further detail.

Figure 5:
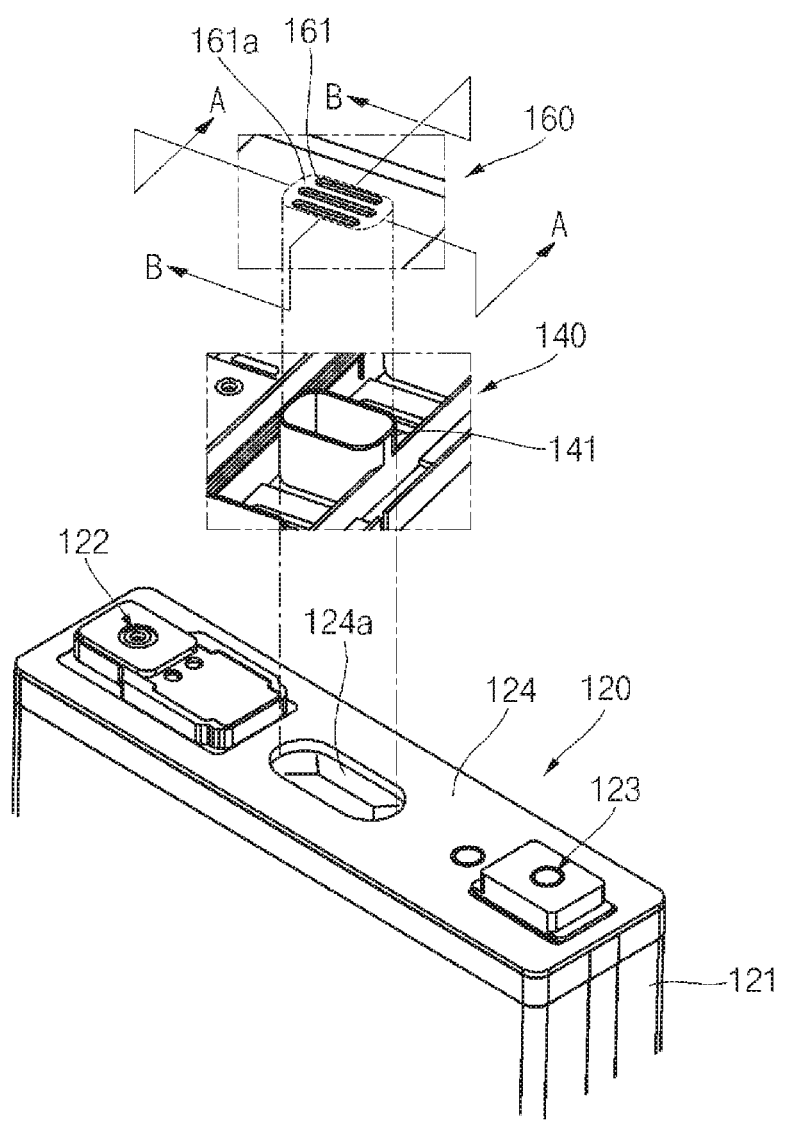
FIG. 5 is an exploded perspective view showing a top plate and a top cover in the energy storage module shown in FIGS. 1 to 3.
Figure 6A:
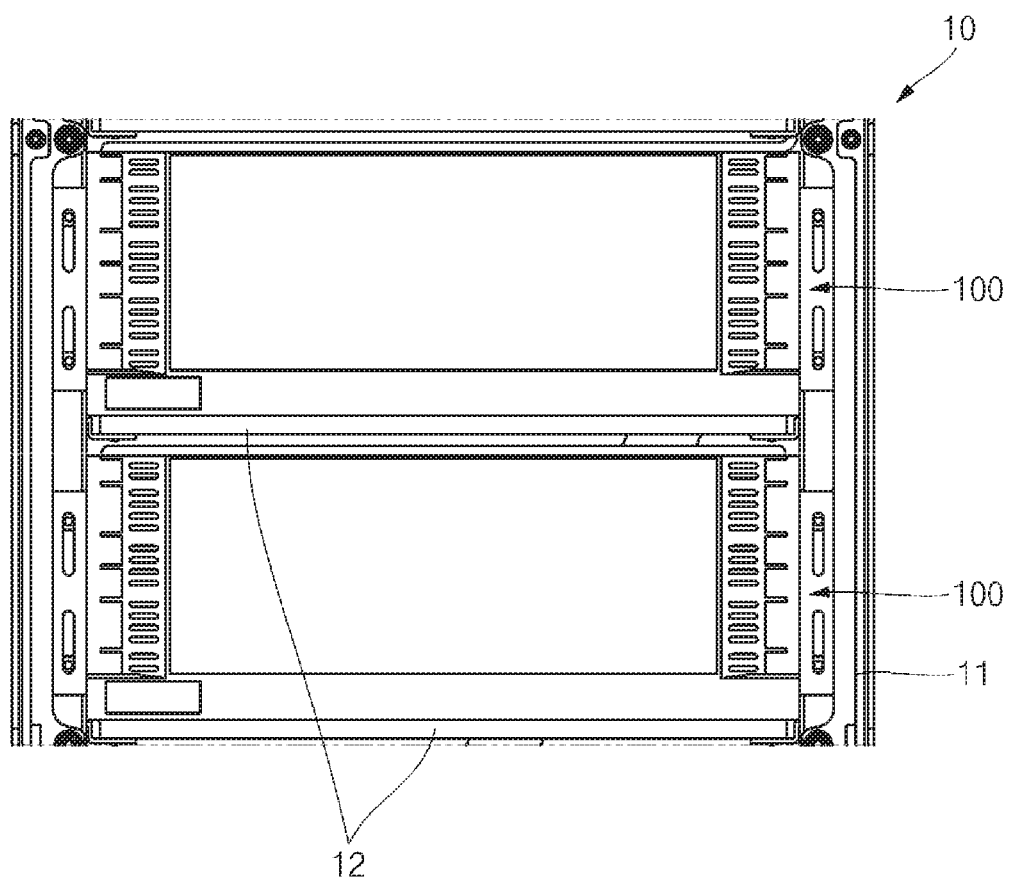
FIG. 6A is a partial view of a rack on which a plurality of energy storage modules are coupled according to an embodiment of the present disclosure.
Figure 6B:
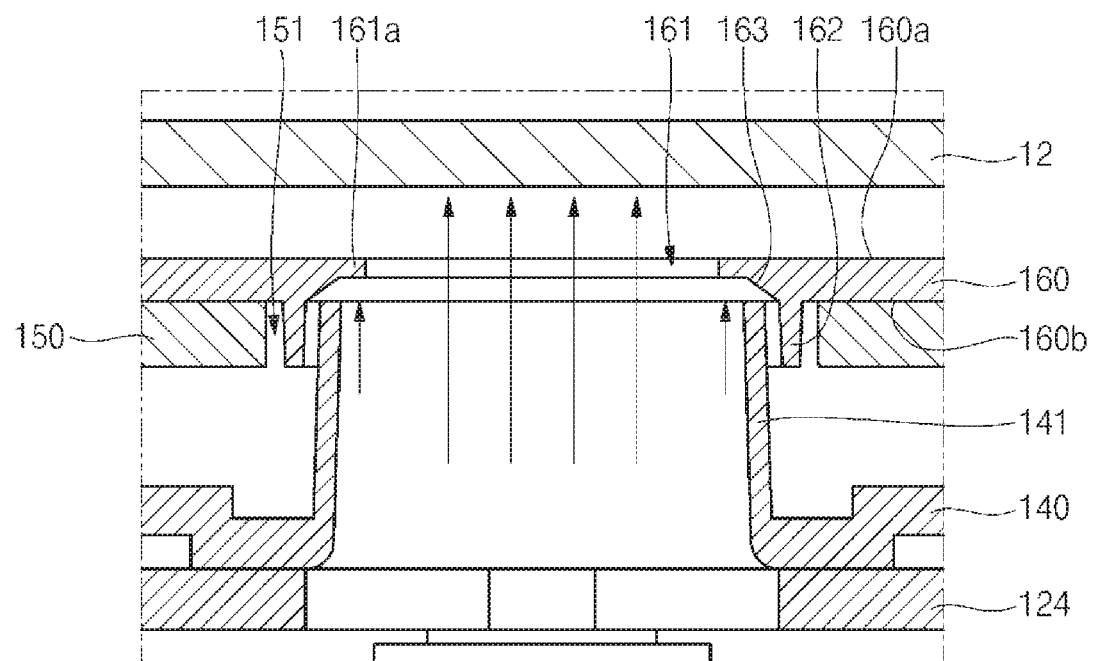
FIG. 6B is a cross-sectional view taken along the line A-A of FIG. 5.
Figure 6C:
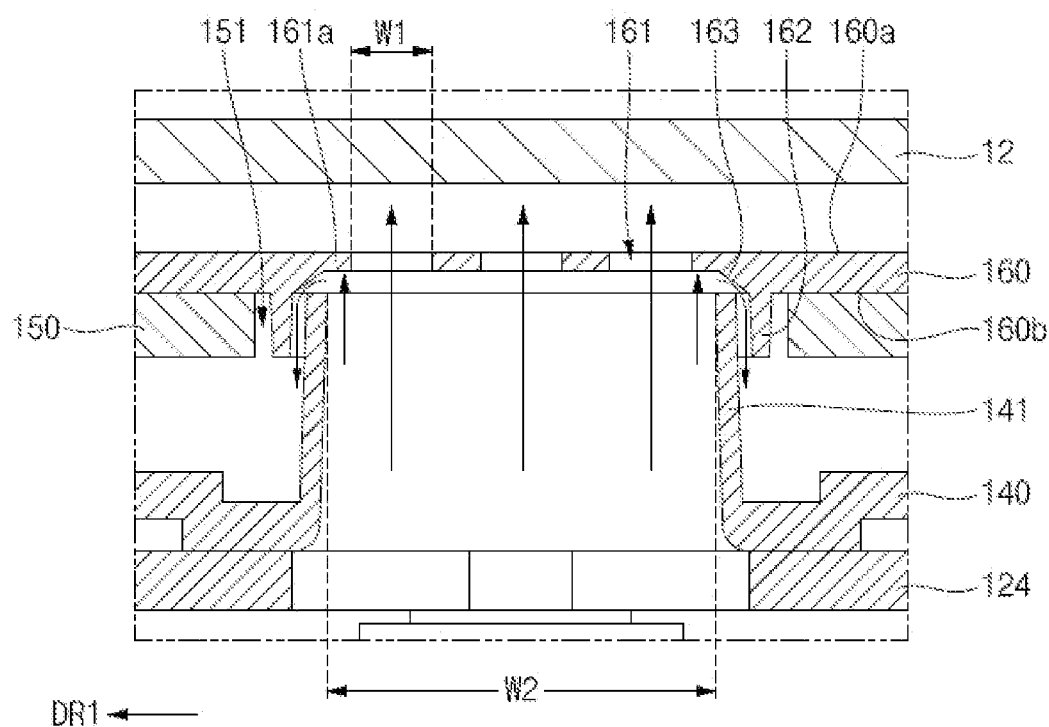
FIG. 6C is a cross-sectional view taken along the line B-B of FIG. 5.
Figure 6D:
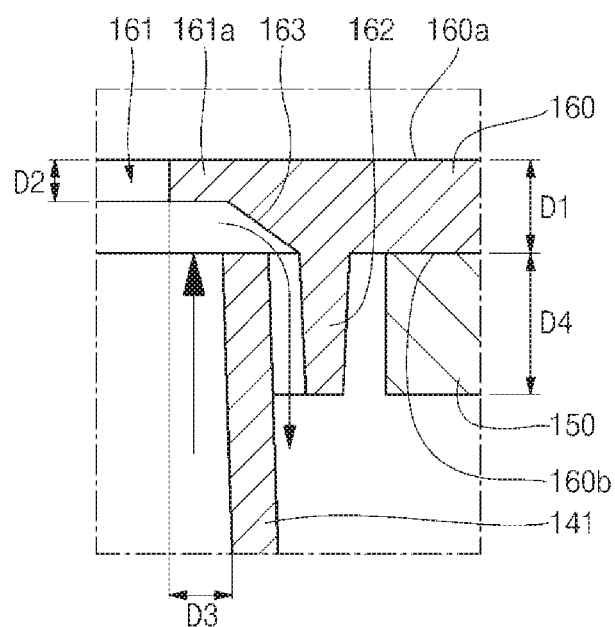
FIG. 6D is an enlarged view of a region of FIG. 6C.
Figure 7:
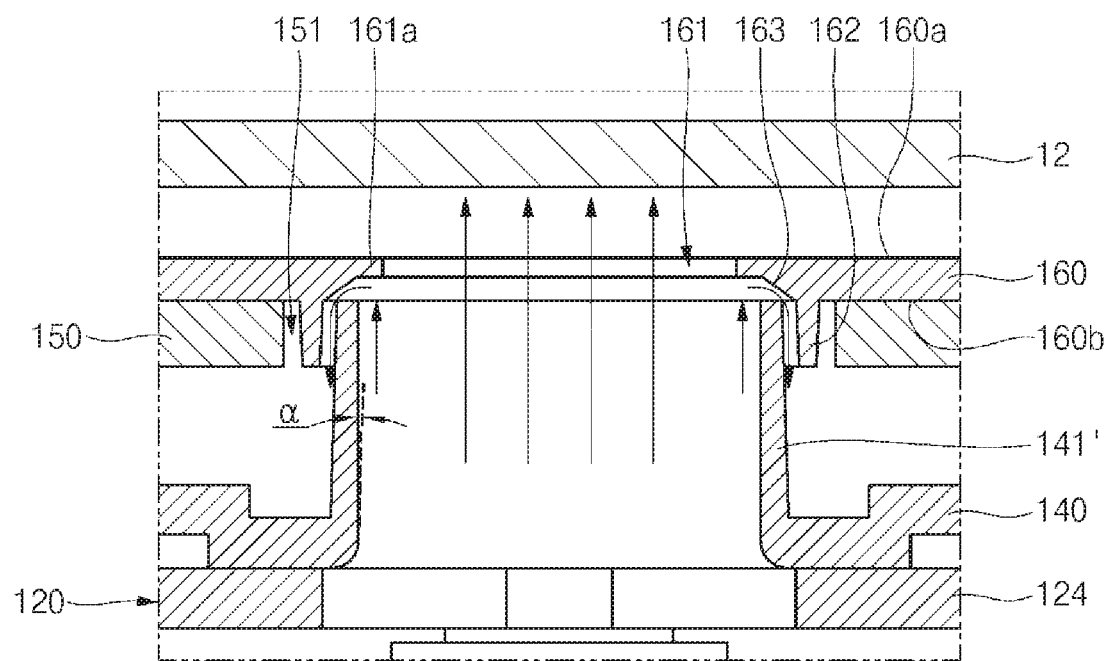
FIG. 7 is a cross-sectional view of a duct according to another embodiment of the present disclosure.

FIG. 5 is an exploded perspective view showing a top plate and a top cover in the energy storage module shown in FIGS. 1 to 3. FIG. 6A is a partial view of a rack on which a plurality of energy storage modules are coupled according to an embodiment of the present disclosure; FIG. 6B is a cross-sectional view taken along the line A-A of FIG. 5; FIG. 6C is a cross-sectional view taken along the line B-B of FIG. 5; and FIG. 6D is an enlarged view of a region of FIG. 6C. FIG. 7 is a cross-sectional view of a duct according to an embodiment of the present disclosure.

Referring to FIG. 5, the ducts 141 located on the top plate 140 respectively correspond to vents 124*a* of battery cells 120, and discharge holes 161 of the top cover 160 may be positioned to respectively correspond to the ducts 141 of the top plate 140. For example, the battery cells 120 may be arranged along a first direction DR1 (see FIG. 8A), and the ducts 141 may be spaced apart along the first direction DR1 (see FIG. 3).

In an embodiment, each of the battery cells 120 includes an electrode assembly accommodated in a case 121 and is shaped such that a cap plate 124 covers a top portion of the case 121. The electrode assembly may be configured by winding, stacking, or laminating a positive electrode plate and a negative electrode plate, each having a portion coated with an active material (e.g., a coating or coated portion), in a state in which a separator is positioned between the positive electrode plate and the negative electrode plate. A top portion of the case 121 may be sealed by the cap plate 124. In an embodiment, the vent 124*a* is located at approximately a center of the cap plate 124 and has a smaller thickness than other regions of the cap plate 124. In addition, first and second electrode terminals 122 and 123, which are electrically connected to the electrode assembly may be positioned at opposite sides of the cap plate 124. For the sake of convenience, in the following description, the first electrode terminal 122 will be referred to as a negative electrode terminal, and the second electrode terminal 123 will be referred to as a positive electrode terminal, but the polarities thereof may be reversed. Occurrences of ignition of the battery cells 120 may be reduced by using particular compositions of active materials of the battery cells 120, thereby increasing safety.

Referring to FIG. 6A, the energy storage module 100 according to an embodiment of the present disclosure may include a plurality of the energy storage modules 100 to be coupled to a rack 10. The number of the energy storage modules 100 may vary according to a desired capacity, and the energy storage modules 100 may be mounted in the rack 10 and then fixed thereto. The rack 10 may include a frame 11 defining the overall external shape of the rack 10 and shelves 12 at different levels of the frame 11 to support bottom portions (e.g., bottom surfaces) of the energy storage modules 100. In FIG. 6A, two shelves 12 are shown in the frame 11 with energy storage modules 100 respectively mounted on the shelves 12, but the present disclosure is not limited to the numbers in the illustrated embodiment.

The ducts 141 are passages through which the gas discharged through the vents 124a of the respective battery cells 120 passes, and protrude from the top plate 140. In an embodiment, the duct 141 may have a cross-sectional shape, e.g., an elliptical shape, corresponding to the vent 124a of each of the battery cells 120. In an embodiment, the duct 141 may taper away from a bottom portion thereof with the inner diameter thereof gradually decreasing upward. In some embodiments, the duct 141 may have a uniform thickness and may be inclined at an angle (e.g., a predefined angle) ($\alpha$) toward the interior thereof. In an embodiment, to allow the gas to be efficiently discharged without intruding in a working range of the vent 124a of the battery cell 120, the angle ($\alpha$) of inclination of the duct 141 may be in a range from about 1° to about 3°.

In an embodiment, to effectively discharge the gas discharged through the vent 124a of the battery cell 120, the duct 141 may have a height corresponding to that of the top cover 160. In an embodiment, a height of the duct 141 may be in a range from 18 mm to 18.4 mm. When the height of the duct 141 is greater than or equal to 18 mm, the gas generated from the vent 124a of the battery cell 120 can be prevented or substantially prevented from returning to the vent 124a even if the gas collides with the shelf 12 after moving along the duct 141. In addition, when the height of the duct 141 is less than or equal to 18.4 mm, the shelf 12 and the duct 141 can be easily manufactured.

In an embodiment, because the duct 141 has a height corresponding to that of the top cover 160, the gas passing through the duct 141 may move toward the discharge hole 161 of the top cover 160.

In addition, as shown in FIG. 7, a duct 141' according to another embodiment of the present disclosure may taper away from a bottom portion thereof with an inner diameter thereof gradually decreasing upward. In addition, the duct 141' may be configured to have a thickness gradually decreasing from the bottom portion thereof to a top portion thereof. In an embodiment, an interior surface of the duct 141' may be gradually upwardly inclined with an angle (e.g., a predefined angle) to the exterior, and the exterior surface of the duct 141' may be gradually upwardly inclined with an angle (e.g., a predefined angle) to the interior. In an embodiment, to allow the gas to be efficiently discharged without intruding in a working range of the vent 124a of the battery cell 120, an inclination angle of the interior of the duct 141' may be in a range from about 1° to about 3°. When the inclination angle is greater than or equal to 1°, the gas generated from the vent 124a of the battery cell 120 can be easily accumulated upwardly. When the inclination angle is less than or equal to 3°, rigidity of the duct 141' can be maintained and upward movement of the gas may be prevented or substantially prevented from being restricted by the duct 141'.

Referring to FIGS. 6B to 6D, in an embodiment, the top cover 160 may include an exhaust area 161a having a plurality of discharge openings (e.g., discharge holes) 161 located therein, protrusion parts (e.g., protrusions) 162 located on a bottom surface of the top cover 160, and an inclined part 163 located between the exhaust area 161a and each of protrusion parts 162. The exhaust area 161a is positioned on a top portion of the duct 141 and may be defined by a region forming peripheries around the discharge holes 161. In an embodiment, the exhaust area 161a may have a thickness D2 smaller than a thickness D1 of the top cover 160 (D1>D2). In an embodiment, the thickness D2 of the exhaust area 161a may be two thirds (⅔) of the thickness D1 of the top cover 160. In an embodiment, the thickness D2 of the exhaust area 161a may be at least 1.0 mm. In this case, injection molding can be properly performed while minimizing or reducing occurrence of flames when the gas is discharged. For example, when the thickness D1 of the top cover 160 is about 2.5 mm, the thickness D2 of the exhaust area 161a may be about 1.5 mm.

The gas discharged through the vent 124a of the battery cell 120 can be exhausted through the discharge holes 161 located in the exhaust area 161a. In FIG. 6C, three discharge holes 161 are shown, but the present disclosure is not limited to the number in the illustrated embodiment. In an embodiment, the plurality of discharge holes 161 may have an overall area of greater than or equal to about 30% of the exhaust area 161a, thereby facilitating exhaust performance. In an embodiment, a width W1 of each of the discharge holes 161 in the first direction DR1 may be less than 3 mm. When the width W1 of the discharge hole 161 is less than or equal to 3 mm, internal flames can be prevented or substantially prevented from spreading to the exterior and facilitating user safety by preventing or substantially preventing a user's hand from directly contacting the battery cell from the exterior of the top cover 160. Further, the width W1 in the first direction DR1 may be less than a width W2 in the first direction DR1 of the passage defined by a corresponding one of the ducts 141.

The discharge holes 161 are positioned within the ducts 141, and top ends of the ducts 141 are covered by the exhaust area 161a. In some embodiments, regions of the exhaust area 161a where the discharge holes 161 are not located may extend into the interior of the ducts 141, as shown in FIG. 6C. In an embodiment, a distance D3 of the exhaust area 161a extending into the interior of each of the ducts 141 may be less than or equal to about 2 mm, and, in an embodiment, in a range from 1 mm to 1.5 mm.

The protrusion parts 162 protrude from the bottom surface 160b of the top cover 160 and are coupled to the exterior of the ducts 141. In an embodiment, the protrusion parts 162 may be shaped to respectively correspond to cross-sections of the ducts 141 and may cover (e.g. surround) the exhaust area 161a. In an embodiment, a cross-sectional area of each of the protrusion parts 162 is greater than that of each of the ducts 141, such that a space may be defined between each of the ducts 141 and each of the protrusion parts 162. Some of the gas discharged through the vent 124a of the battery cell 120 may collide with the exhaust area 161a positioned above the duct 141 to then move toward the space. In an embodiment, a height D4 of each of the protrusion parts 162 may be in a range from about 2 mm to about 4 mm, and, in an embodiment, 3 mm. If the height of the protrusion part 162 is less than 2 mm, the protrusion part 162 may not be high enough to guide the gas colliding with the exhaust area 161a to the exterior of the duct 141. If the height of the protrusion part 162 is greater than 4 mm, the protrusion part 162 may be positioned excessively high, making it difficult to efficiently discharge the gas. In an embodiment, a ratio of the height D4 of the protrusion parts 162 to the height of the duct 141 may be in a range from about 1:4 to about 1:9, and, in an embodiment, 1:6. When the ratio of the height D4 of the protrusion parts 162 to the height of the duct 141 is greater than or equal to 1:4, the protrusion part 162 can be manufactured so as to easily cover the top portion of the duct 141. When the ratio of the height D4 of the protrusion parts 162 to the height of the duct 141 is less than or equal to 1:9, the gas passing through the duct 141 can be easily guided upwardly.

The inclined part 163 is positioned between the exhaust area 161a and the protrusion part 162. In an embodiment, since the exhaust area 161a having a relatively small thickness is connected to the protrusion part 162 in the top cover 160, the inclined part 163 is inclined. In some examples, the inclined part 163 may be configured to have a thickness gradually increasing toward the protrusion part 162 in the exhaust area 161a. The top end of the duct 141 is positioned at a bottom portion of the inclined part 163. The inclined part 163 may prevent or substantially prevent the gas discharged through the vent 124a of the battery cell 120 from penetrating back into the vent 124a. For example, even if the gas discharged through the vent 124a of the battery cell 120 collides with the exhaust area 161a extending into the interior of the duct 141 while upwardly moving along the duct 141, the gas may be discharged to the exterior of the duct 141 along the inclined part 163 and the protrusion part 162. Therefore, the gas can be prevented or substantially prevented from penetrating back into the vent 124a of the battery cell 120, thereby improving safety of the energy storage module 100. In an embodiment, the inclined part 163 may have a slope in a range from about 30° to about 60°, and, in an embodiment, from about 40° to about 50°, with respect to the exterior surface of the duct 141. When the slope of the inclined part 163 with respect to the exterior surface of the duct 141 is greater than or equal to 30°, the gas discharged through the vent 124a is allowed to be discharged to the exterior, thereby easily preventing or substantially preventing the gas from penetrating back into the vent 124a. When the slope of the inclined part 163 with respect to the exterior surface of the duct 141 is less than or equal to 60°, the inclined part 163 can be integrated with the protrusion part 162.

As shown in FIGS. 6A to 6D, if the vent 124a of the battery cell 120 ruptures, the gas moves upwardly along the duct 141, as indicated by the arrows. In FIGS. 6B and 6C, the vent 124a remaining in the cap plate 124 is shown. However, if the gas is internally generated, the vent 124a ruptures and may then be removed. In addition, after some of the discharged gas collides with the exhaust area 161a extending into the interior of the duct 141, the gas moves along the inclined part 163 and the protrusion part 162. In addition, the gas passing through the duct 141 may move toward the exterior through the discharge holes 161 of the top cover 160 positioned above the duct 141. By another shelf 12 of the rack 10, which supports another energy storage module 100, the gas accumulates between the top surface 160a of the top cover 160 and an adjacent shelf 12. In an embodiment, a distance between the top surface 160a of the top cover 160 and the adjacent shelf 12 may be in a range from about 3 mm to about 7 mm. When the distance is greater than or equal to about 3 mm, the heat generated from the energy storage module 100 can be easily discharged to the exterior. When the distance is less than or equal to about 7 mm, a high-temperature inert gas atmosphere can be easily created, which will be further described below.

In an embodiment, when a gas begins to be discharged from a battery cell 120 through a vent 124a, a phase change may begin to occur in a fire extinguishing agent in the extinguisher sheet 150 at a temperature in a range from about 40° C. to about 60° C., and, in an embodiment, a temperature in a range from 45° C. to 55° C. However, even in this case, the fire extinguishing agent may remain inside the extinguisher sheet 150 instead of being sprayed (released) therefrom. In an embodiment, when, afterwards, the amount of gas discharged through the vent 124a gradually increases and a temperature around the vent 124a rises and reaches a temperature in a range from about 120° C. to about 200° C., and, in an embodiment, a temperature in a range from about 130° C. to 190° C., and, in an embodiment, a temperature in a range from 140° C. to 180° C., a gas containing an electrolytic steam may be generated mainly through the vent 124a. Also, the gas in the above temperature range may allow a heat-resistant plastic constituting the top plate 140 and the top cover 160 to remain unmelted. In addition, spraying of some of the fire extinguishing agent may begin.

In an embodiment, the inclined part 163 of the top cover 160 may prevent or substantially prevent the initially generated combustible gas having a relatively low temperature from being induced back into the vent 124a. However, if the separator melts due to a further increase in the internal temperature of the battery cell 120, high-temperature inert gas may be generated with flames. As described above, the inert gas may fill a space between the top surface 160a of the top cover 160 and the adjacent shelf 12 to create an inert gas atmosphere. In addition, the inert gas may also fill the internal space of the duct 141, thereby preventing or substantially preventing oxygen induction, preventing or substantially preventing flames generated in the battery cell 120 from being propagated to neighboring battery cells 120 or another energy storage module 100. In addition, the extinguisher sheet 150, which is positioned under the top cover 160, may operate in response to the high-temperature inert gas to emit or spray the fire extinguishing agent, which will be described in further detail below.

Herein, the configuration and operation of the extinguisher sheet 150 of the energy storage module 100 according to an embodiment of the present disclosure will be described.

Figure 8A:
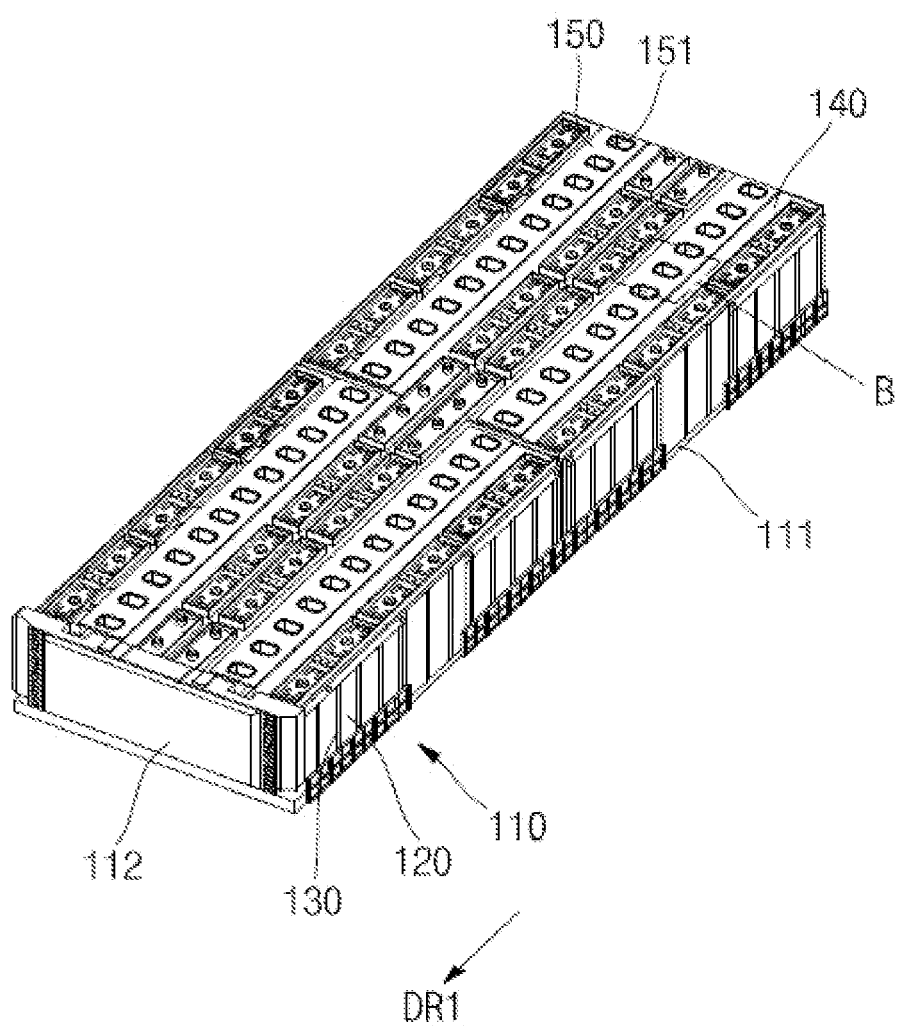
FIG. 8A is a perspective view showing the extinguisher sheet coupled to the top plate of the energy storage module shown in FIGS. 1 to 3.
Figure 8B:
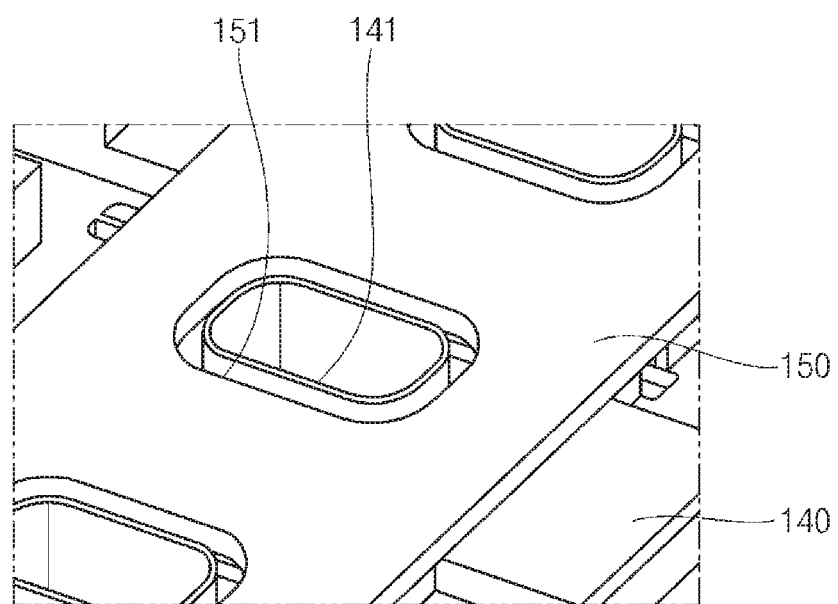
FIG. 8B is an enlarged view of a region "B" of FIG. 8A.
Figure 9A:
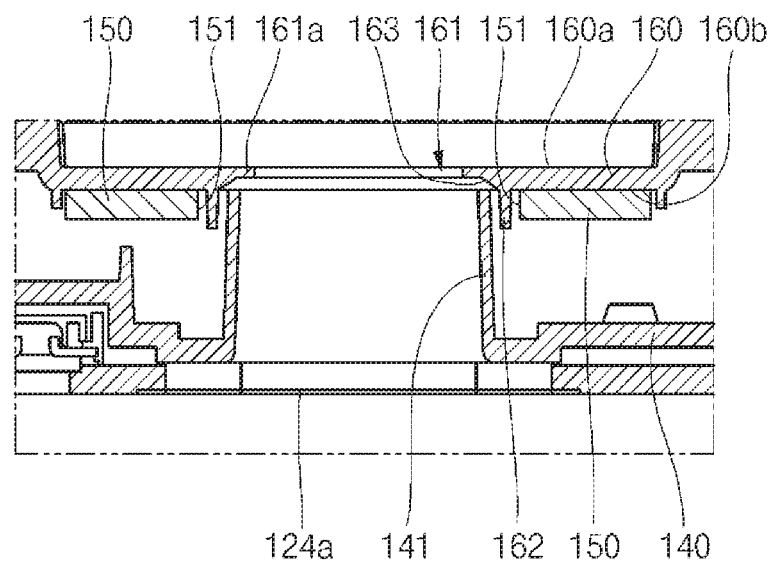
FIGS. 9A and 9B are conceptual cross-sectional views illustrating a state in which an extinguisher sheet operates in the energy storage module shown in FIGS. 1 to 3.
Figure 9B:
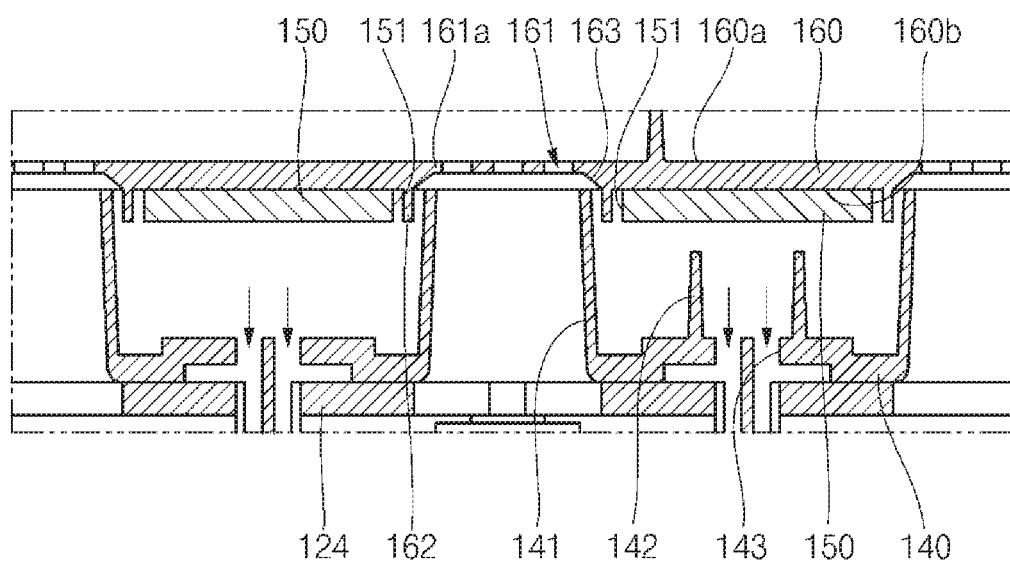

FIG. 8A is a perspective view of the extinguisher sheet coupled to the top plate of the energy storage module shown in FIGS. 1 to 3; and FIG. 8B is an enlarged view of a region "B" of FIG. 8A. FIGS. 9A and 9B are conceptual cross-sectional views illustrating a state in which an extinguisher sheet operates in the energy storage module shown in FIGS. 1 to 3. FIGS. 10A to 10D are views illustrating example configurations of extinguisher sheets in the energy storage module according to embodiments of the present disclosure.

Referring to FIGS. 8A and 8B, the extinguisher sheet 150 is positioned between the top plate 140 and the top cover 160, as described above. As shown in FIG. 8A, the extinguisher sheet 150 may have opening holes 151 coupled to the ducts 141 of the top plate 140. Accordingly, movement of the gases through the ducts 141 may not be influenced by the extinguisher sheet 150.

In addition, referring to FIGS. 9A and 9B, the extinguisher sheet 150 may operate (e.g., may emit the fire extinguishing agent) in response to heat when the inert gas having a relatively high temperature of, for example, about 200° C., is generated. The fire extinguishing agent contained in the extinguisher sheet 150 is emitted by (e.g., is sprayed from) the extinguisher sheet 150 in response to the high-temperature gas. In addition, because a top portion of the extinguisher sheet 150 is covered by the top cover 160, the fire extinguishing agent may be directionally emitted (or sprayed) in a direction away from the bottom surface 160b of the top cover 160. In addition, the fire extinguishing agent may reach the underlying insulation spacers through openings (e.g., fire extinguishing agent openings or opening holes) 143 located between adjacent ones of the ducts 141 of the top plate 140. In an embodiment, a fluid guide protrusion 142 may further be provided around the openings 143 in the duct 141, thereby efficiently guiding the movement of the fire extinguishing agent toward the insulation spacers. As will be further described below, after reaching the insulation spacers, the fire extinguishing agent may move along surfaces of the insulation spacers, thereby extinguishing a fire on a battery cell 120 and cooling the battery cell 120.

Figure 10A:
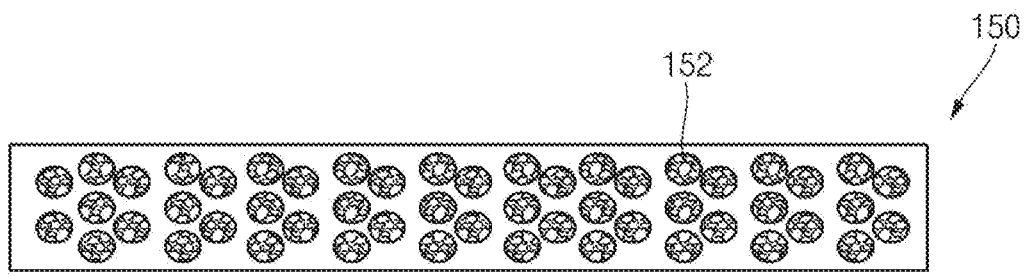
FIGS. 10A to 10D are views illustrating example configurations of extinguisher sheets in the energy storage module according to embodiments of the present disclosure.

The extinguisher sheet 150 may include any of various example types of extinguisher sheets, as shown in FIGS. 10A to 10D. For example, as shown in FIG. 10A, the extinguisher sheet 150 may include receiving parts 152 for receiving (e.g., accommodating or storing) a fire extinguishing agent within an external case made of polyurea and polyurethane. In an embodiment, the receiving parts 152 of the extinguisher sheet 150 may be in forms of micro-sized capsules capable of encapsulating the internal fire extinguishing agent, which includes a halogenated carbon compound (e.g., a halogen-containing hydrocarbon compound, such as a compound consisting only of carbon and halogen atoms), such as, for example, a halogenated ketone based fire extinguishing agent (e.g., NOVEC®, a registered trademark of 3M Corporation, St. Paul, Minnesota). In an embodiment, as described above, the fire extinguishing capsules forming the receiving parts 152 of the extinguisher sheet 150 open (or rupture) to emit the internal fire extinguishing agent when the gas passing through the duct 141 of the top plate 140 reaches a relatively high temperature of about 200° C. and the fire extinguishing capsules may open due to the pressure applied during the phase transformation in a high temperature atmosphere of about 200° C., such that the internal fire extinguishing agent encapsulated within the fire extinguishing capsules is emitted.

In an embodiment, a ratio of the weight of the fire extinguishing agent in the extinguisher sheet 150 to a total weight of the extinguisher sheet 150 may be in a range from 30% to 50%. In other words, a proportion of the fire extinguishing agent contained in the extinguisher sheet 150 to the overall weight of the extinguisher sheet 150 may be in a range from about 30% to about 50%. When the ratio of the weight of the fire extinguishing agent to the total weight of the extinguisher sheet 150 is greater than or equal to 30%, a fire on the battery cell 120 can be appropriately extinguished during the operation of the extinguisher sheet 150. When the ratio of the weight of the fire extinguishing agent to the total weight of the extinguisher sheet 150 is less than or equal to 50%, the extinguisher sheet 150 may easily operate (e.g., rupture) at about 200° C.

In an embodiment, an amount of the fire extinguishing agent may be in a range from 0.12 $g/cm^3$ to 0.82 $g/cm^3$. When the amount of the fire extinguishing agent is greater than or equal to 0.12 $g/cm^3$, the fire extinguishing agent contained in the extinguisher sheet 150 is appropriate for the capacity of battery cells used in the energy storage module 100 including the extinguisher sheet 150 so as to be able to extinguish a fire on any one of the battery cells. When the amount of the fire extinguishing agent is less than or equal to 0.82 $g/cm^3$, the extinguisher sheet 150 may easily operate (e.g., rupture) at about 200° C. or higher.

Figure 10B:
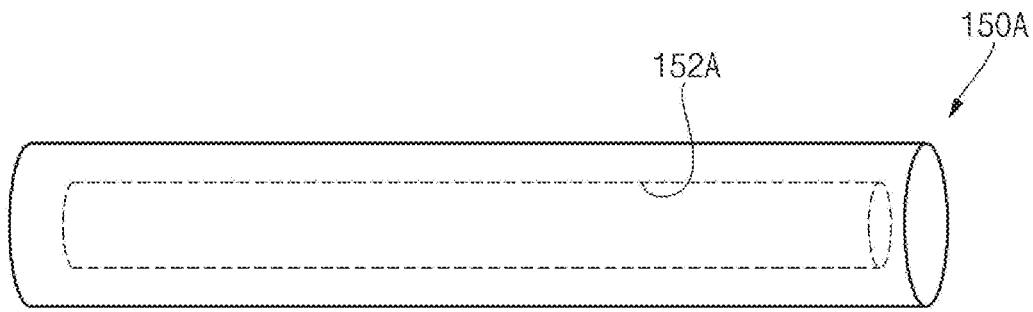

In addition, as shown in FIG. 10B, another example extinguisher sheet 150A may include a tube-type receiving space 152A for receiving (e.g., accommodating or storing) a fire extinguishing agent within the receiving space 152A.

Figure 10C:
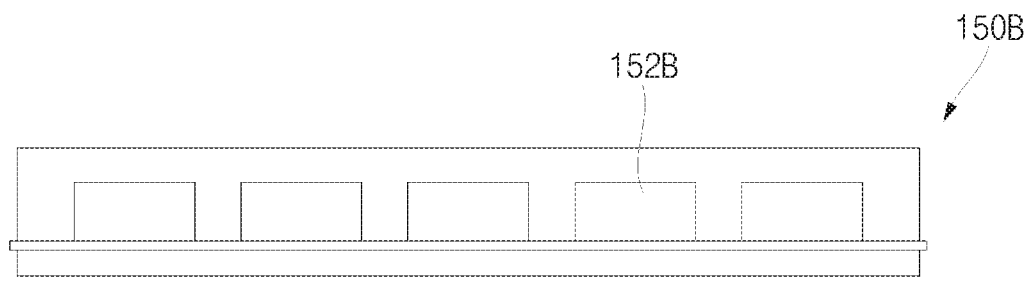

In addition, as shown in FIG. 10C, another example extinguisher sheet 150B may include receiving spaces 152B arranged within the extinguisher sheet 150B to be spaced apart from each other by a distance (e.g., a regular distance). The receiving spaces 152B may include a plurality of receiving spaces to be spaced apart from one another, unlike in the tube-type extinguisher sheet 150A shown in FIG. 10B. In an embodiment, the receiving spaces 152B of the extinguisher sheet 150B may open (e.g., rupture) responsive to only one of the battery cells 120, from which a relatively high-temperature gas is generated, to then emit the fire extinguishing agent. Therefore, when the gas is generated from the plurality of battery cells 120, a fire on a corresponding one of the battery cells 120 can be extinguished.

Figure 10D:
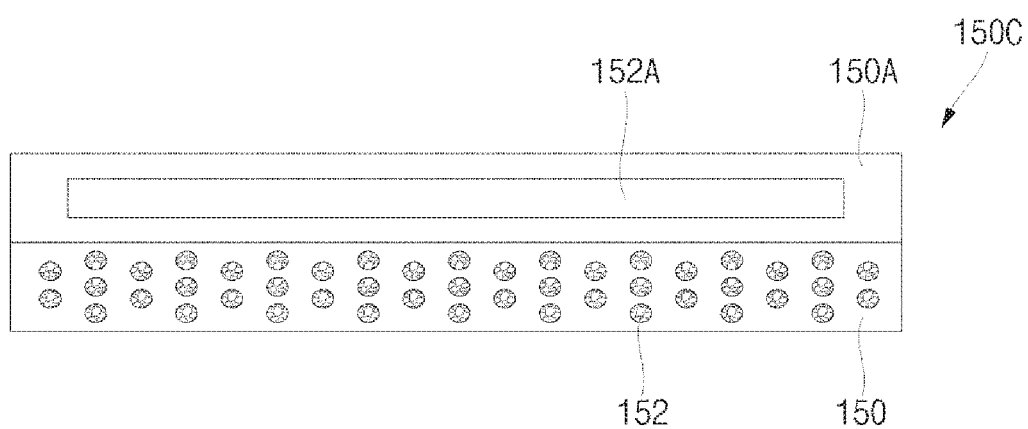

In addition, as shown in FIG. 10D, another example extinguisher sheet 150C may have a multi-layered structure including different types of layers. For example, the extinguisher sheet 150C may include an underlying first extinguisher sheet 150 having capsules 152 located therein, and an overlying second extinguisher sheet 150A having a tube-type receiving space 152A. In an embodiment, the first extinguisher sheet 150 and the second extinguisher sheet 150A may be set to operate at different temperatures. In an embodiment, the first extinguisher sheet 150 and the second extinguisher sheet 150A may operate in sequence according to the temperature and amount of the discharged gas. In addition, with such double-mode operation of the extinguisher sheet 150C, the extinguisher sheet 150C may operate in sequence according to the temperature and the time of gas generated, thereby constantly emitting the fire extinguishing agent.

Herein, configurations and operations of the battery cells 120 and insulation spacers 130 in the energy storage module according to an embodiment of the present invention will be described.

Figure 11:
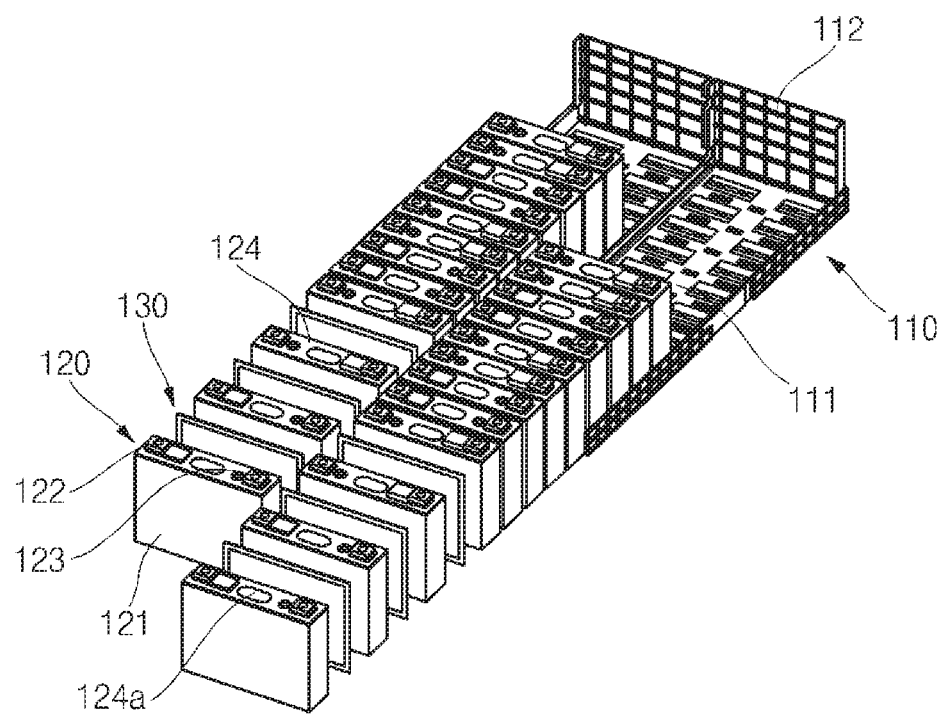
FIG. 11 is a perspective view of battery cells and insulation spacers arranged in a bottom plate of the energy storage module shown in FIGS. 1 to 3.
Figure 12:
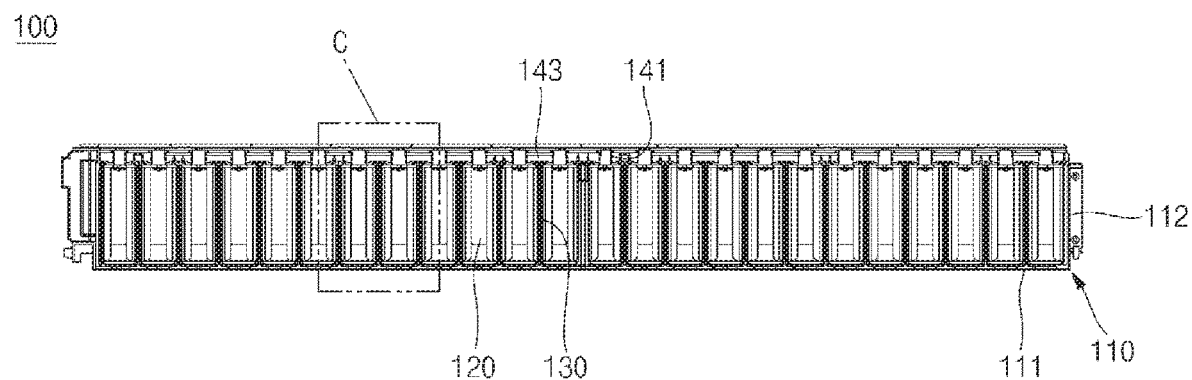
FIG. 12 is a cross-sectional view taken along the line C-C of FIG. 1.
Figure 13:
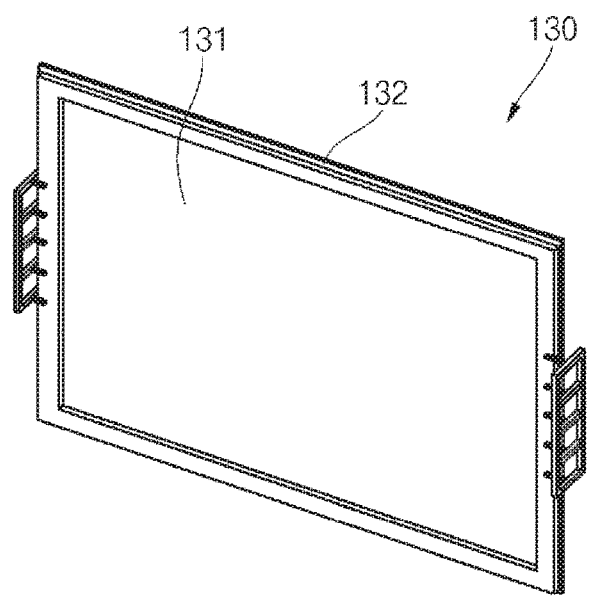
FIG. 13 is a perspective view illustrating a configuration of an insulation spacer in the energy storage module shown in FIGS. 1 to 3.
Figure 14:
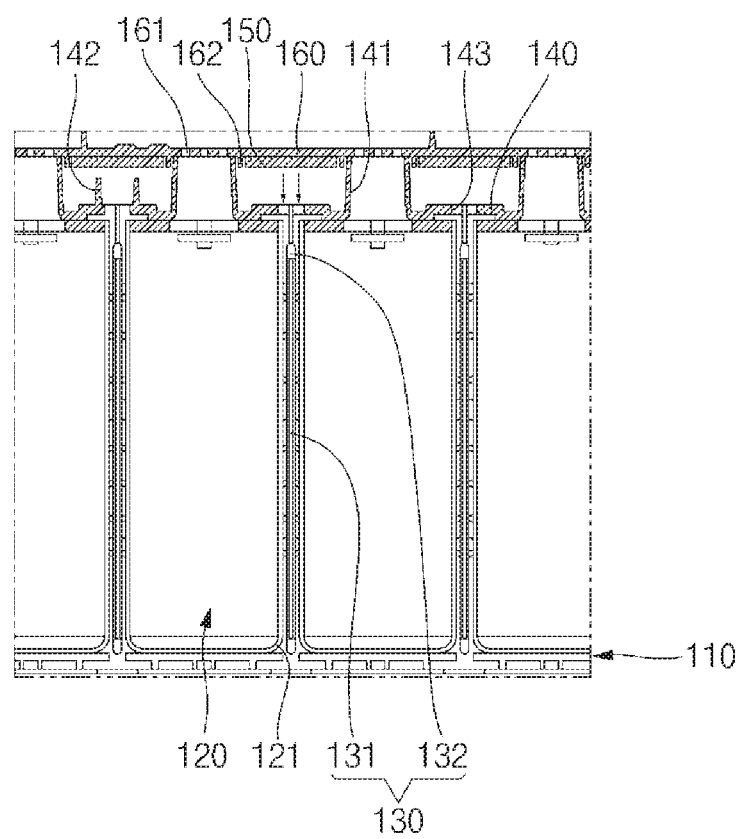
FIG. 14 is an enlarged view of a region "C" of FIG. 12.

FIG. 11 is a perspective view of battery cells and insulation spacers arranged in a bottom plate of the energy storage module shown in FIGS. 1 to 3. FIG. 12 is a cross-sectional view taken along the line C-C of FIG. 1. FIG. 13 is a perspective view illustrating a configuration of an insulation spacer in the energy storage module shown in FIGS. 1 to 3. FIG. 14 is an enlarged view of a region "C" of FIG. 12.

Referring to FIGS. 11 and 12, in an embodiment, the battery cells 120 may be alternately arranged on a top surface of the bottom plate 111 of the cover member 110 with the insulation spacers 130 (e.g., with the insulation spacers 130 arranged between adjacent ones of the battery cells 120). For example, the battery cells 120 may be arranged in a plurality of columns (e.g., two columns) along the top surface of the bottom plate 111, and the insulation spacers 130 may be positioned between adjacent ones of the battery cells 120.

Each of the battery cells 120 includes an electrode assembly accommodated in a case 121. The electrode assembly may be configured by winding, stacking, or laminating a positive electrode plate and a negative electrode plate, each having a portion coated with an active material (e.g., a coating or coated portion), in a state in which a separator is positioned between the positive electrode plate and the negative electrode plate. In an embodiment, electrode terminals 122 and 123, which are electrically connected to uncoated regions (e.g., uncoated portions) of the positive and negative electrode plates, may be exposed at an upper portion of the case 121 through the cap plate 124. The electrode terminals 122 and 123 may be referred to as a first electrode terminal 122 and a second electrode terminal 123, respectively, defining, for example, a negative electrode terminal and a positive electrode terminal, but the polarities thereof may be reversed. Occurrences of ignition of the battery cells 120 can be reduced by using particular compositions of active materials of the battery cells 120, thereby increasing safety.

Referring to FIG. 13, the insulation spacers 130 may be positioned between each of (e.g., between adjacent ones of) the battery cells 120 to prevent or substantially prevent the battery cells 120 from contacting one another, thereby maintaining the battery cells 120 in an electrically isolated state. In an embodiment, a reference distance or space (e.g., a predetermined distance) is maintained between each of the insulation spacers 130 and the battery cells 120 to establish external air passages, thereby allowing for the cooling of the battery cells 120.

The insulation spacers 130 may include a sheet part (e.g., a sheet) 131 and an edge part (e.g., an edge) 132. The sheet part 131 may include a flame-retardant (or non-combustible) sheet that prevents (or substantially impedes) a fire from spreading to neighboring battery cells 120 and a heat-insulating sheet that prevents (or substantially impedes) heat from being propagated to neighboring battery cells 120 when a fire starts in any of the battery cells 120. In some embodiments, the flame-retardant sheet may include (or may be) mica, and the heat-insulating sheet may include (or may be) bio-soluble fiber ceramic paper containing an alkaline earth metal, but the present disclosure is not limited to these materials.

In some embodiments, an edge part 132 may be provided along peripheral edges of the sheet part 131. In an embodiment, the edge part 132 may include (or may be made of) a plastic material, such as a general polyethylene or polypropylene, and may be coupled to edges of the sheet part 131 by using a double injection process to fix the shape of the sheet part 131.

As described above, when a fire extinguishing agent is applied from top portions of the insulation spacers 130, the fire extinguishing agent may move downwardly along the surfaces of the sheet part 131. Therefore, the fire extinguishing agent may contact the case 121 of the adjacent battery cells 120, thereby performing extinguishing and cooling operations on the battery cells 120. Herein, movement of the fire extinguishing agent will be described in further detail.

As shown in FIG. 14, the top plate 140 may further include the openings (e.g., fire extinguishing agent openings or opening holes) 143 respectively located to correspond to (e.g., located over or above) the insulation spacers 130. Accordingly, the fire extinguishing agent, when emitted from the extinguisher sheet 150, may pass through the top plate 140 through the openings 143 of the top plate 140 to reach the insulation spacers 130. In addition, the fire extinguishing agent may move along surfaces of the insulation spacers 130 that face the case 121 of the adjacent battery cells 120, thereby extinguishing any fire and cooling the battery cells 120. The fire extinguishing agent is emitted by the extinguisher sheet 150 located over one or more of the battery cells 120, the temperature of which is higher than a reference temperature (e.g., about 200° C.). Therefore, the fire extinguishing agent may be sprayed from a top portion of the battery cell 120 having an elevated temperature. In addition, because the fire extinguishing agent moves along the surfaces of the insulation spacers 130 positioned at front and rear sides of the corresponding battery cell 120, both extinguishing and cooling of the corresponding battery cell 120 can be performed.

Herein, a configuration of an energy storage module according to another embodiment of the present invention will be described.

Figure 15:
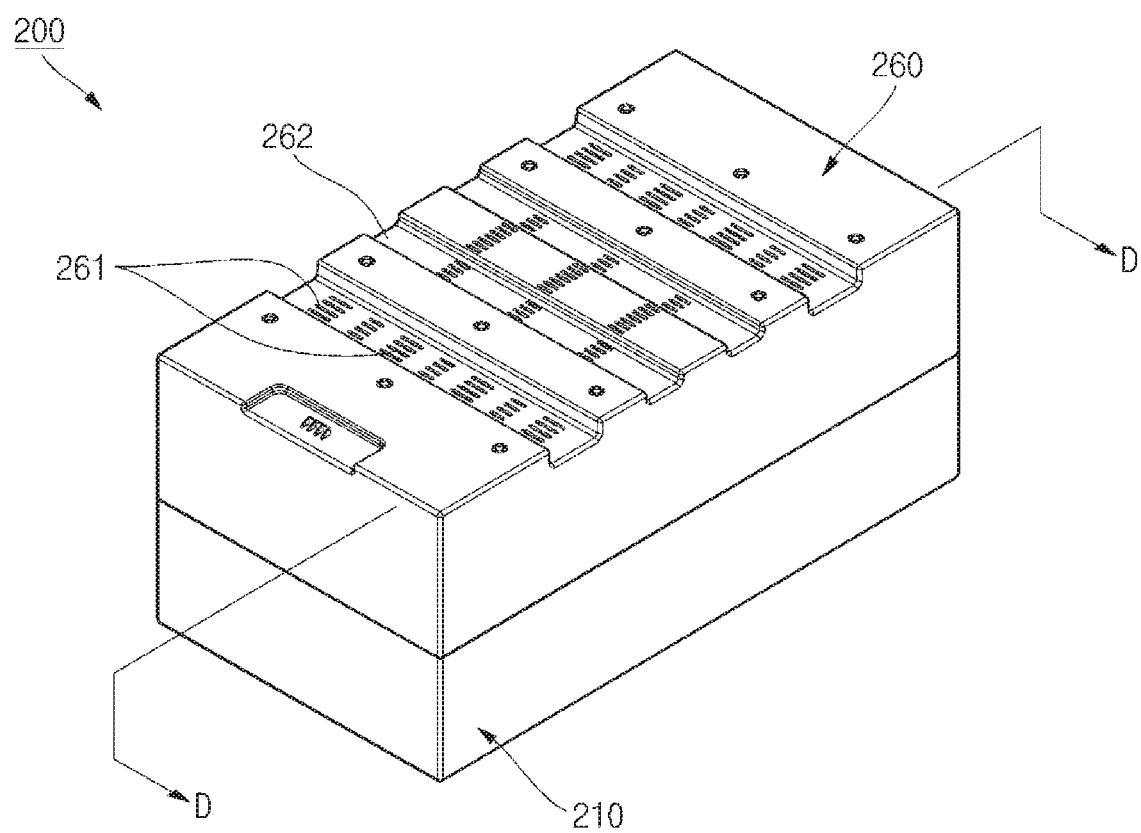
FIG. 15 is a perspective view of an energy storage module according to another embodiment of the present disclosure.
Figure 16:
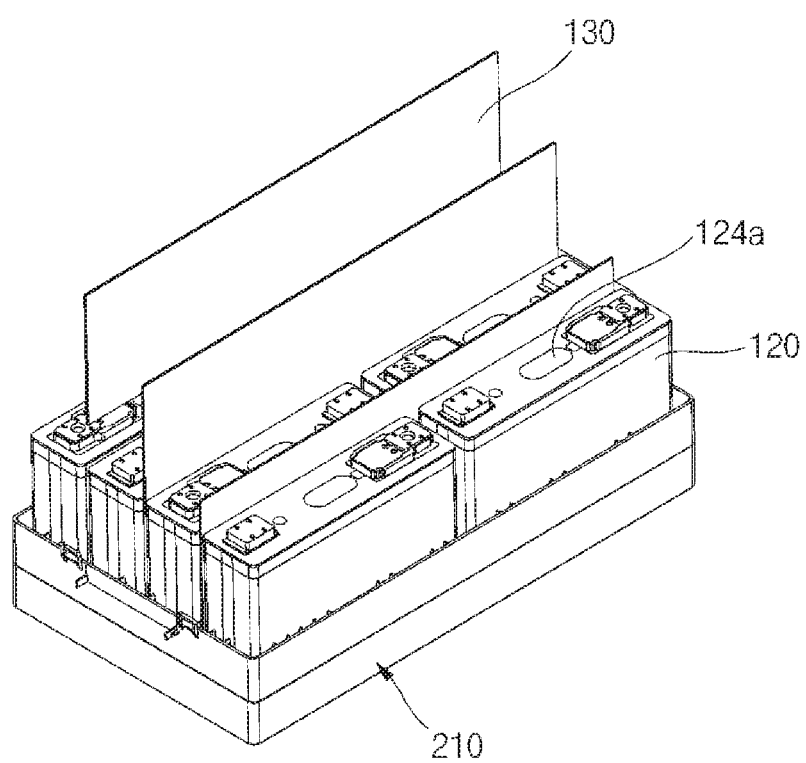
FIG. 16 is a perspective view of battery cells and insulation spacers mounted in the energy storage module shown in FIG. 15.
Figure 17:
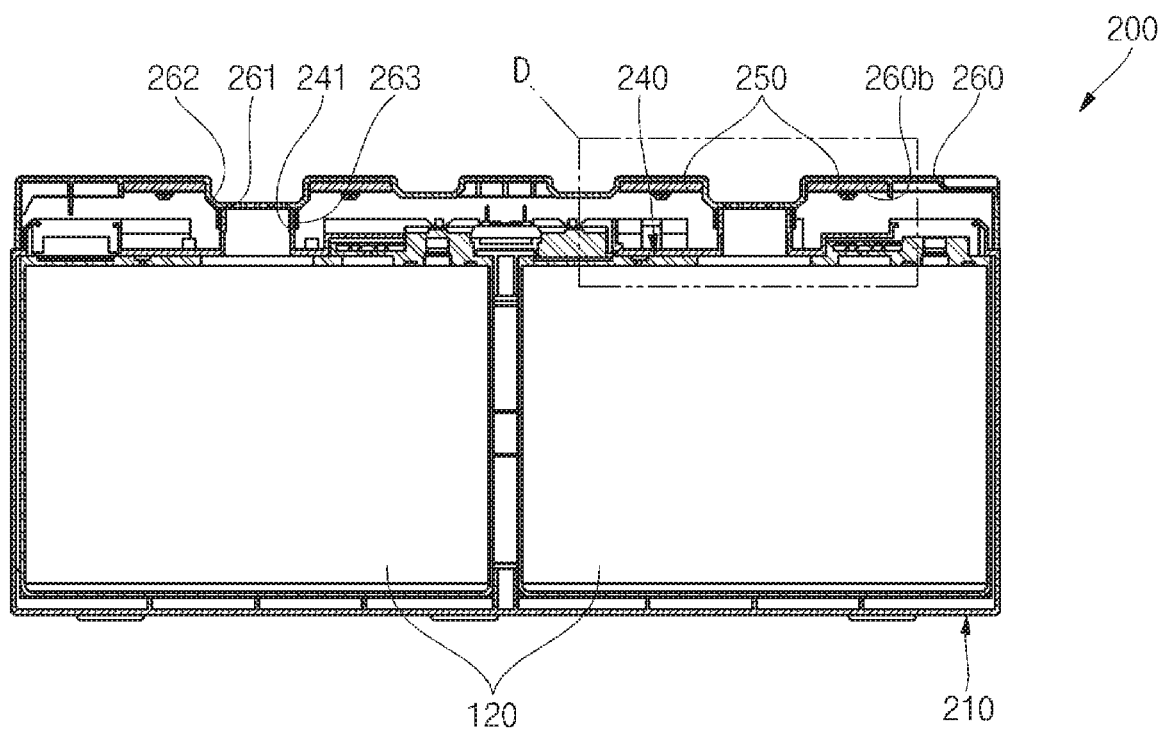
FIG. 17 is a cross-sectional view taken along the line D-D of FIG. 15.
Figure 18:
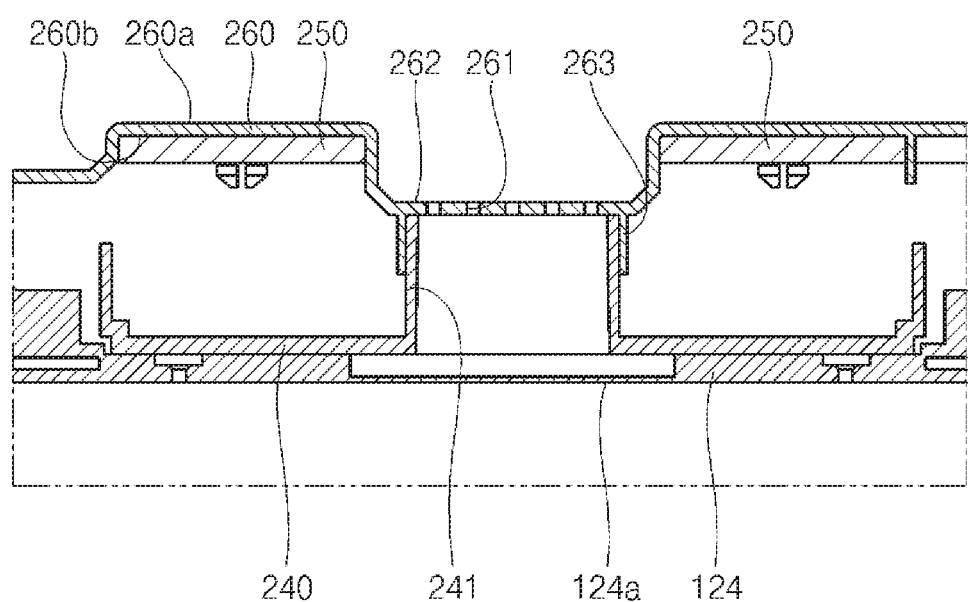
FIG. 18 is an enlarged view of a region "D" of FIG. 17.

FIG. 15 is a perspective view of an energy storage module according to another embodiment of the present disclosure. FIG. 16 is a perspective view of battery cells and insulation spacers mounted in the energy storage module shown in FIG. 15. FIG. 17 is a cross-sectional view taken along the line D-D of FIG. 15. FIG. 18 is an enlarged view of a region "D" of FIG. 17.

Referring to FIGS. 15 to 18, the energy storage module 200 according to another embodiment of the present disclosure may include a cover member 210, battery cells 120, insulation spacers 130, a top plate 240, an extinguisher sheet 250, and a top cover 260.

The energy storage module 200 according to an embodiment of the present disclosure may be smaller in size than the energy storage module 100 described above, such that a smaller number of battery cells 120 may be received in a space of the energy storage module 200, which is formed together by the cover member 210, the top plate 240, and the top cover 260, than in the energy storage module 100. Therefore, configurations and sizes of the cover member 210, the top plate 240, and the top cover 260 may vary according to the number of battery cells received therein. However, the energy storage module 200 may be basically configured in a similar manner as the energy storage module 100.

The top plate 240 is coupled to the cover member 210 while covering the top portion of the battery cell 120. The top plate 240 includes a duct 241 corresponding to the vent 124a formed on the top surface of each of the battery cells 120. The duct 241 may include a plurality of ducts arranged in a direction, for example, in a length direction.

The extinguisher sheet 250 is positioned between the top plate 240 and the top cover 260. In an embodiment, the extinguisher sheet 250 may include a plurality of planar sheets located at opposite sides of the ducts 241 of the top plate 240 and extending in a length direction of the top plate 240. The extinguisher sheet 250 may be mounted on a bottom surface 260b of the top cover 260. Here, the length direction may refer to a direction in which the ducts 241 of the top plate 240 extend.

The top cover 260 is coupled to the top portion of the top plate 240. The top cover 260 may cover the top plate 240 and the extinguisher sheet 250, thereby protecting the top plate 240 and the extinguisher sheet 250 from external impacts applied to a top surface 260a of the top cover 260. In addition, the top cover 260 may include an exhaust area 262 having discharge openings (e.g., discharge holes) 261 located therein, and protrusion parts (e.g., protrusions) 263. The ducts 241 are respectively coupled to (e.g., may respectively extend into) the interior of the protrusion parts 263. In an embodiment, each of the discharge holes 261 may include a plurality of discharge holes arranged in a direction, for example, in a length direction of the top cover 260. In addition, the discharge holes 261 may be positioned to correspond to the ducts 241 of the top plate 240. Accordingly, if the vent 124a of the battery cell 120 ruptures, the gas discharged through the vent 124a of the battery cell 120 may move to the exterior along the ducts 241 of the top plate 240 and the discharge holes 261 of the top cover 260.

In an embodiment, the exhaust area 262 having the discharge holes 261 has a smaller height than other regions in the top cover 260. For example, the exhaust area 262 is configured to downwardly protrude from the top cover 260 to establish a gas movement passage thereon. The exhaust area 262 is coupled to the top portion of the duct 241. Here, the protrusion parts 263 located on the bottom surface of the exhaust area 262 are coupled to the exterior of the duct 241.

In an embodiment, the duct 241 may be configured to have a smaller height than the top cover 260. With this configuration, the gas discharged through the ducts 241 and the discharge holes 261 may gather in the gas movement passage located on the exhaust area 262. In an embodiment, the gas may be discharged to the exterior side by using, for example, a separate fan or a suction structure (e.g., a vacuum), thereby allowing the gas generated by the battery cells 120 to be discharged quickly.

Herein, a configuration of the battery cell 120 used in the energy storage module 100 according to an embodiment of the present invention will be described in further detail.

Figure 19A:
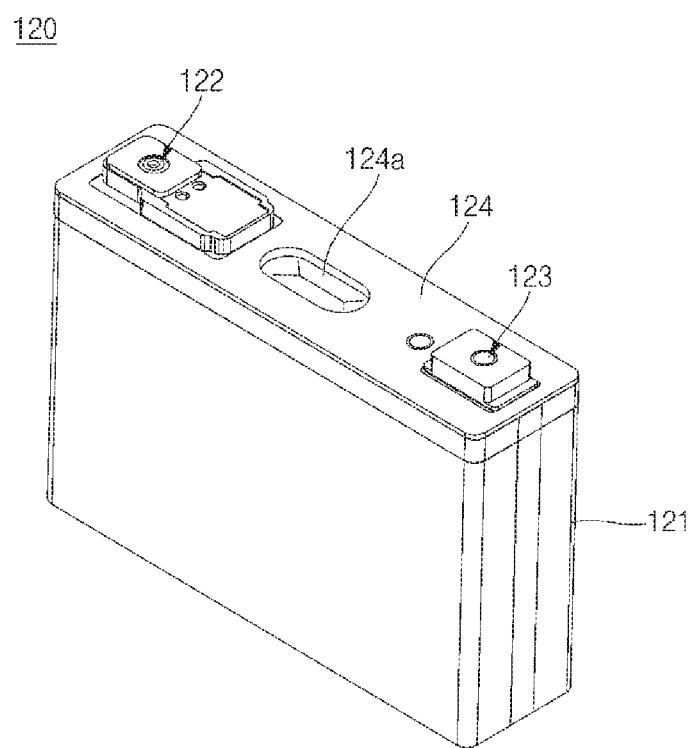
FIGS. 19A and 19B are a perspective view and a cross-sectional view, respectively, of a battery cell to be included in an energy storage module according to an embodiment of the present disclosure.
Figure 19B:
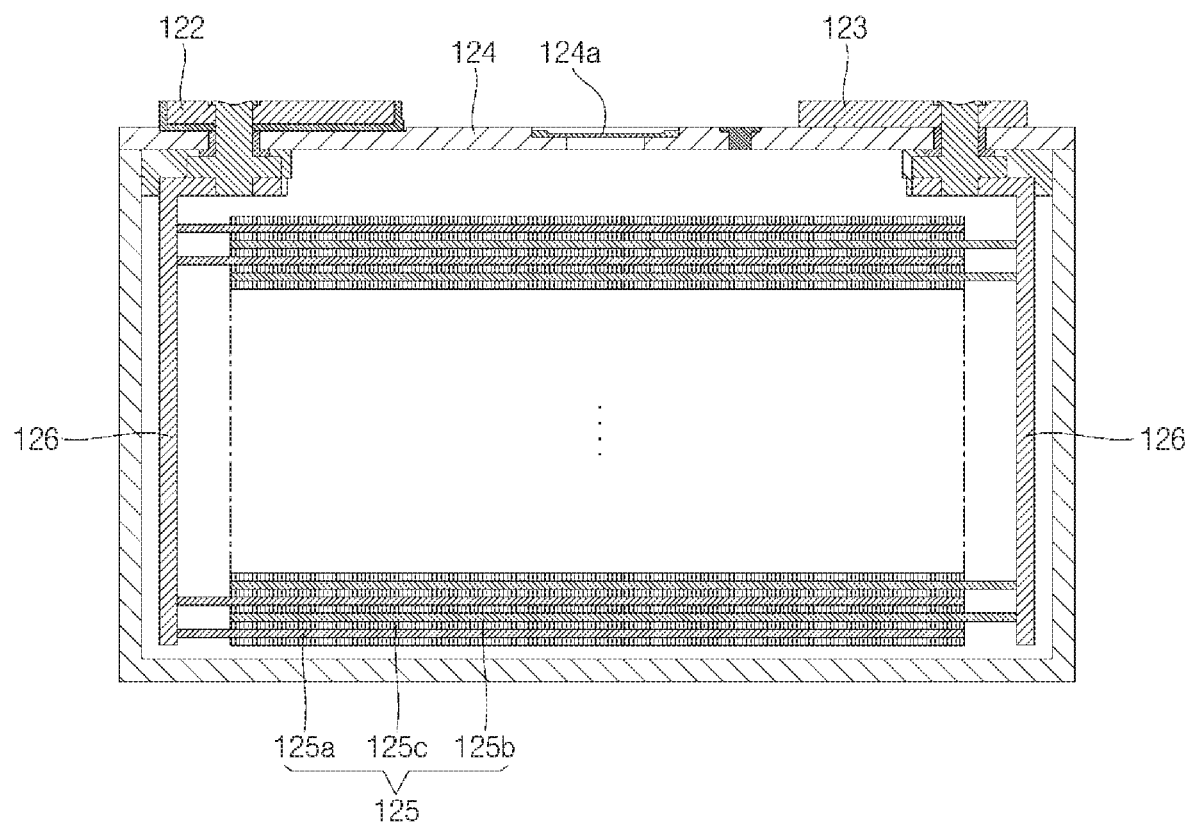

FIGS. 19A and 19B are a perspective view and a cross-sectional view, respectively, of a battery cell used in an energy storage module according to an embodiment of the present disclosure.

Referring to 19A and 19B, the battery cell 120 is configured such that an electrode assembly 125 is accommodated in a case 121, and a cap plate 124 covers a top portion of the case 121. In an embodiment, a vent 124a having a smaller thickness than other regions is located approximately at a center of the cap plate 124. The duct 141 of the top plate 140 is located to correspond to a top portion of the vent 124a, as described above.

In an embodiment, the electrode assembly 125 may be electrically connected to a first electrode terminal 122 and a second electrode terminal 123 located on the cap plate 124 through a pair of current collectors 126. For the sake of convenience, in the following description, the first electrode terminal 122 will be referred to as a negative electrode terminal and the second electrode terminal 123 will be referred to as a positive electrode terminal, but polarities thereof may also be reversed.

The electrode assembly 125 may include a negative electrode 125a, a positive electrode 125b positioned to face the negative electrode 125a, and a separator 125c positioned between the negative electrode 125a and the positive electrode 125b, and the electrode assembly 125 may be accommodated in the case 121 together with an electrolyte (not shown).

While some example embodiments have been described to practice the energy storage module of the present disclosure, it will be understood by those of ordinary skill in the art that various changes in form and details may be made therein without departing from the scope of the present disclosure as set forth by the following claims.

What is claimed is:

1. An energy storage module comprising:
a cover member comprising an internal receiving space configured to accommodate battery cells arranged along a first direction and each comprising a vent;
a top plate coupled to a top of the cover member and comprising ducts respectively corresponding to the vents of the battery cells, the ducts spaced apart along the first direction and each defining a passage to discharge a gas from the vent of a corresponding battery cell of the battery cells;
a top cover coupled to a top portion of the top plate and comprising discharge holes passing through the top cover, located in an exhaust area, and corresponding to the ducts; and
an extinguisher sheet located between the top cover and the top plate along a height direction, and configured to emit a fire extinguishing agent, the extinguisher sheet comprising opening holes located to respectively correspond to the ducts, such that, in a plan view as viewed along the height direction, the extinguisher sheet is entirely outside peripheries of the ducts,
wherein the top cover comprises protrusion parts located on a bottom surface of the top cover, covering the exhaust area, and each surrounding an exterior of a corresponding duct of the ducts.

2. The energy storage module of claim 1, wherein the extinguisher sheet comprises a receiving space receiving a fire extinguishing agent within an external case made of polyurea and polyurethane.

3. The energy storage module of claim 2, wherein the receiving space comprises one or more capsules or tubes.

4. The energy storage module of claim 3, wherein the fire extinguishing agent comprises a halogenated carbon compound.

5. The energy storage module of claim 1, wherein the extinguisher sheet comprises different types of sheets configured to emit the fire extinguishing agent at different temperatures.

6. The energy storage module of claim 1, wherein a ratio of a weight of the fire extinguishing agent in the extinguisher sheet to a total weight of the extinguisher sheet is from 30% to 50%.

7. The energy storage module of claim 1, wherein an amount of the fire extinguishing agent in the extinguisher sheet is from 0.12 $g/cm^3$ to 0.82 $g/cm^3$.

8. The energy storage module of claim 1, wherein the top cover further comprises an inclined part having a thickness gradually increasing toward a corresponding protrusion part of the protrusion parts in the exhaust area.

9. The energy storage module of claim 8, wherein a top end of the corresponding duct is lower than the inclined part.

10. The energy storage module of claim 8, wherein a space is defined between the corresponding duct and the corresponding protrusion part, and a gas discharged from the vent of a corresponding battery cell of the battery cells passes through the corresponding duct to be discharged to the space defined between the corresponding duct and the corresponding protrusion part by the inclined part.

11. The energy storage module of claim 1, wherein the corresponding duct has an inner diameter gradually decreasing upward.

12. The energy storage module of claim 1, wherein a portion of the exhaust area extends over an interior of the ducts.

13. The energy storage module of claim 1, wherein the exhaust area has a smaller thickness than the top cover.

14. The energy storage module of claim 1, wherein the exhaust area protrudes downwardly from the top cover.

15. The energy storage module of claim 1, wherein each of the ducts extends into an interior of a corresponding protrusion part of the protrusion parts.

16. The energy storage module of claim 1, wherein a plurality of discharge holes of the discharge holes corresponds to a corresponding one of the ducts, and each of the plurality of discharge holes has a respective width in the first direction that is less than a width of the passage in the first direction of the corresponding one of the ducts.

17. The energy storage module of claim 16, wherein the width of each of the plurality of discharge holes in the first direction is less than or equal to 3 mm.

18. The energy storage module of claim 16, wherein an area of the plurality of discharge holes of the discharge holes corresponding to the corresponding one of the ducts is greater than or equal to 30% of that of the exhaust area.

* * * * *